US012052427B2

(12) United States Patent
Wu et al.

(10) Patent No.: US 12,052,427 B2
(45) Date of Patent: Jul. 30, 2024

(54) VIDEO DATA PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventors: Jingran Wu, Shenzhen (CN); Shishen Xu, Shenzhen (CN); Jun Zhao, Shenzhen (CN); Hao Li, Shenzhen (CN); Yaqing Li, Shenzhen (CN); Chengjie Tu, Shenzhen (CN); Zirong Zhu, Shenzhen (CN); Liang Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 200 days.

(21) Appl. No.: 17/713,205

(22) Filed: Apr. 4, 2022

(65) Prior Publication Data
US 2022/0232222 A1    Jul. 21, 2022

Related U.S. Application Data

(63) Continuation of application No. PCT/CN2020/126067, filed on Nov. 3, 2020.

(30) Foreign Application Priority Data

Jan. 22, 2020    (CN) .......................... 202010075680.9

(51) Int. Cl.
H04N 19/146    (2014.01)
H04N 19/159    (2014.01)
(Continued)

(52) U.S. Cl.
CPC ......... H04N 19/146 (2014.11); H04N 19/159 (2014.11); H04N 19/172 (2014.11); H04N 19/34 (2014.11)

(58) Field of Classification Search
None
See application file for complete search history.

(56) References Cited

U.S. PATENT DOCUMENTS

2008/0316307 A1*  12/2008  Petersohn ............... G11B 27/28
                                                  348/E7.02
2020/0195934 A1*  6/2020  Xing ....................... G06V 20/49

FOREIGN PATENT DOCUMENTS

CN    109286825 A    1/2019
CN    110324621 A    10/2019
(Continued)

OTHER PUBLICATIONS

The World Intellectual Property Organization (WIPO) International Search Report for PCT/CN2020/126067 Jan. 22, 2021 6 Pages (including translation).
(Continued)

Primary Examiner — Xiaolan Xu
(74) Attorney, Agent, or Firm — ANOVA LAW GROUP, PLLC

(57) ABSTRACT

A video data processing method is provided to a server. The method includes: obtaining a video sequence associated with a video source and obtaining a video quality standard parameter associated with the video sequence; determining a video feature according to video quality standard parameter; predicting an encoding bit rate according to the video quality standard parameter and the video feature; and encoding the video sequence according to the encoding bit rate to obtain an encoded video sequence associated with the video source.

18 Claims, 10 Drawing Sheets

(51) Int. Cl.
  *H04N 19/172* (2014.01)
  *H04N 19/34* (2014.01)

(56) References Cited

FOREIGN PATENT DOCUMENTS

| | | |
|---|---|---|
| CN | 110324721 A | 10/2019 |
| CN | 110719457 A | 1/2020 |
| CN | 111263154 A | 6/2020 |
| WO | 2016007215 A1 | 1/2016 |

OTHER PUBLICATIONS

The State Intellectual Property Office of the People's Republic of China (SIPO) Office Action 1 for 2020100756809 Jul. 1, 2021 9 Pages (including translation).
Ioannis Katsavounidis, "Dynamic optimizer—a perceptual video encoding optimization framework," Netflix Technology Blog, Mar. 5, 2018, Retrieved from the Internet:URL: https://medium.com/netflix-techblog/dynamic-optimizer-a-perceptual-video-encoding-optimization-framework-e19f1e3a277f. 21 pages.

* cited by examiner

VIDEO DATA PROCESSING METHOD AND APPARATUS, AND STORAGE MEDIUM

RELATED APPLICATION(S)

This application is a continuation application of PCT Patent Application No. PCT/CN2020/126067 filed on Nov. 3, 2020, which claims priority to Chinese Patent Application No. 202010075680.9, entitled "VIDEO DATA PROCESSING METHOD AND APPARATUS, AND STORAGE MEDIUM" filed on Jan. 22, 2020, all of which are incorporated by reference in entirety.

FIELD OF THE TECHNOLOGY

The present disclosure relates to the field of Internet technologies, and in particular, to a video data processing method and apparatus, and a storage medium.

BACKGROUND

Certain video data composed of frame sequences may be encoded by the same encoder. For example, for video data A and video data B with different video content, generally a default encoding bit rate is used to encode the two pieces of video data, and as a result there may be a great fluctuation in the video quality of video data obtained after video encoding, and further it may be difficult to ensure the accuracy of video encoding.

In addition, indiscriminately encoding video data with different data content at the same encoding bit rate may cause different degrees of waste in encoding resources. For example, for some video data with single video content (for example, the video data A), the encoding resources may be wasted because the video quality of encoded video data A is excessively high.

SUMMARY

Embodiments of the present disclosure provide a video data processing method and apparatus, and a storage medium, which can improve the accuracy of video encoding and reduce the waste in encoding resources.

In one aspect, the present disclosure provides a video data processing method, including: obtaining a video sequence associated with a video source and obtaining a video quality standard parameter associated with the video sequence; determining a video feature according to the video quality standard parameter; determining an encoding bit rate according to the video quality standard parameter and the video feature; and encoding the video sequence according to the encoding bit rate to obtain an encoded video sequence associated with the video source.

In another aspect, the present disclosure provides a video data processing apparatus, including: a memory storing computer program instructions; and a processor coupled to the memory and configured to execute the computer program instructions and perform: obtaining a video sequence associated with a video source and obtain a video quality standard parameter associated with the video sequence; determining a video feature according to the video quality standard parameter; determining an encoding bit rate according to the video quality standard parameter and the video feature; and encoding the video sequence according to the encoding bit rate to obtain an encoded video sequence associated with the video source.

In yet another aspect, the present disclosure provides a non-transitory computer-readable storage medium storing computer program instructions executable by at least one processor to perform: obtaining a video sequence associated with a video source and obtain a video quality standard parameter associated with the video sequence; determining a video feature according to the video quality standard parameter; determining an encoding bit rate according to the video quality standard parameter and the video feature; and encoding the video sequence according to the encoding bit rate to obtain an encoded video sequence associated with the video source.

According to embodiment(s) of the present disclosure, a video feature related to each video segment (that is, the video sequence) can be quickly extracted by analyzing video content in each video segment of the video source once, so that given a set target quality, an encoding bit rate for encoding each video segment can be predicted by a prediction model, and further, given a set quality index (that is, a set video quality standard parameter), encoding bit rates of different video segments can be obtained through prediction, which can improve the accuracy of video encoding and reduce the waste in encoding resources while ensuring a specific video quality.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

Figure 1:
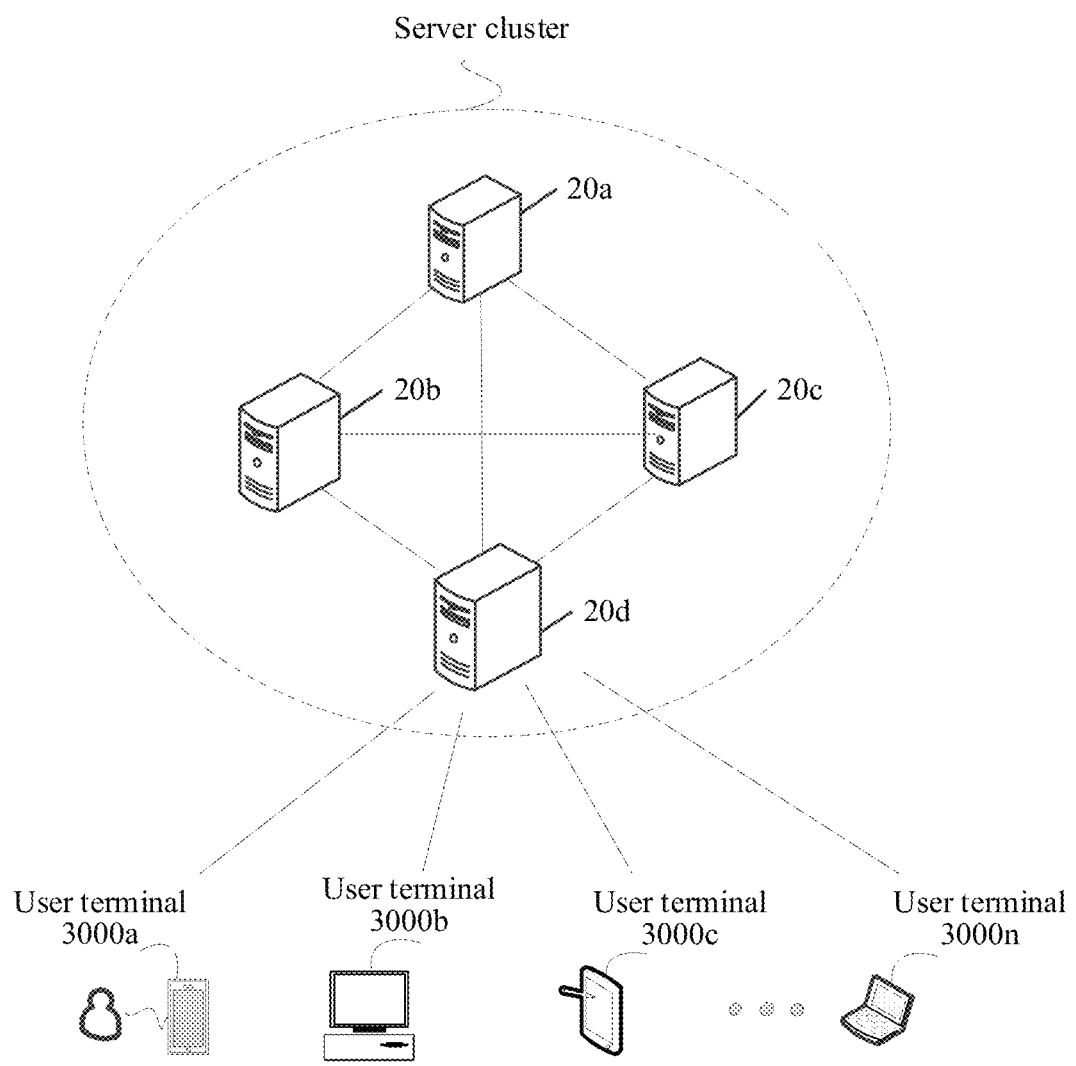
FIG. 1 is a schematic structural diagram of a network architecture according to embodiment(s) of the present disclosure.

FIG. 1 is a schematic structural diagram of a network architecture according to an embodiment of the present disclosure. As shown in FIG. 1, the network architecture may include a server cluster and a user terminal cluster. The user terminal cluster may include a plurality of user terminals, and as shown in FIG. 1, may include a user terminal 3000a, a user terminal 3000b, a user terminal 3000c, . . . , and a user terminal 3000n. As shown in FIG. 1, the user terminal 3000a, the user terminal 3000b, the user terminal 3000c, . . . , and the user terminal 3000n may each establish a network connection to any server in the server cluster, so that each user terminal may exchange data with the corresponding server through the network connection.

For ease of understanding, in this embodiment of the present disclosure, one user terminal may be selected, from the plurality of user terminals shown in FIG. 1, as a target user terminal. The target user terminal may include a smart terminal having a video data acquisition function (for example, a video data recording function or the like) such as a smart phone, a tablet computer, a notebook computer, a smart television set, a smart watch, or a desktop computer. For example, in this embodiment of the present disclosure, the user terminal 3000a shown in FIG. 1 may be referred to as a target user terminal in which a target client having a video data recording function may be integrated. The target client integrated in the target user terminal may include a client having a frame sequence (for example, video data) loading and recording function such as an instant messaging client (for example, a WeChat client or a QQ client), a multimedia client (for example, a video playback client), an entertainment client (for example, a game client), or a virtual room client (for example, a live client).

In this embodiment of the present disclosure, video data acquired by the target user terminal through a browser page or a target client may be uniformly referred to as raw video data (for example, the raw video data A), and the raw video data A may be further uploaded to any server in the server cluster through the network connection. In this embodiment of the present disclosure, any server in the server cluster may be uniformly referred to as a service server. For ease of understanding, in this embodiment of the present disclosure, an implementation in which the service server connected to the target user terminal is a server 20d shown in FIG. 1 is used as an example, to describe the specific process of multi-transcoding a video source in different service scenes in the server 20d.

In a video-on-demand scene, the raw video data uploaded to the service server by the target user terminal may be on-demand video data (that is, the raw video data may be a segment of video data). In a video live scene, the raw video data uploaded to the service server by the target user terminal may be recorded live video data, and the service scene for obtaining the raw video data is not limited herein.

In the video-on-demand scene, after receiving the raw video data A, the server 20d may store the raw video data A to a service database. The server 20d in this embodiment of the present disclosure may add, after obtaining video data (for example, the raw video data B) uploaded by another user terminal in the user terminal cluster, the raw video data B to a first transcoding database where the raw video data A is located for storage, so that each raw video data in these raw video data can be sliced subsequently to obtain video segments of each raw video data. In this embodiment of the present disclosure, each raw video data stored in the first transcoding database may be referred to as a video source. In addition, in the video-on-demand scene, a plurality of video segments (for example, a video segment 1, a video segment 2, . . . , and a video segment n) obtained after slicing any one video source may be uniformly referred to as first video sequences in this embodiment of the present disclosure.

Further, in the video-on-demand scene, to improve the transcoding efficiency of multi-transcoding of each video segment (that is, each first video sequence) at different resolutions after slicing, in this embodiment of the present disclosure, each first video sequence obtained after slicing in the server 20d is synchronously distributed to other servers in the same distributed network, so that each of the other servers may further multi-transcode, by using a video data processing apparatus 2000 having a video data processing function (not shown in FIG. 1), the corresponding received video segment (that is, the first video sequence), to quickly obtain a multi-transcoded bit stream associated with the first video sequence.

For ease of understanding, in this embodiment of the present disclosure, the service server configured to obtain the raw video data (that is, the video source) may be uniformly referred to as a second server, which in a distributed transcoding system may be a distributed server in a distributed cluster (for example, the server 20d in the server cluster of FIG. 1). In addition, in this embodiment of the present disclosure, other servers (that is, other service servers) in the same distributed network as the second server may be uniformly referred to as first servers, which in the video-on-demand scene may receive the first video sequence obtained after the video source is sliced by the second server.

Upon obtaining of the video source, the second server may quickly identify whether the service scene to which the video source pertains is a video live scene corresponding to a live service or a video-on-demand scene corresponding to an on-demand service. For video sources in different service scenes, the service servers may select different transcoding methods.

For example, after identifying that the obtained raw video data is on-demand video data, the second server may determine that the service scene to which the on-demand video data pertains is a video-on-demand scene, and in this implementation, the second server may directly slice the obtained video source according to a slice segmentation rule (for example, a first slice segmentation rule). For example, the second server may cut the video source into a plurality of video segments in the first slice segmentation rule based on duration, shot content, or the like and distribute these video segments to the first servers in the distributed cluster. In this embodiment of the present disclosure, a video segment distributed by the second server and received by each first server may be uniformly referred to as a first video sequence.

After receiving the first video sequence, the first server may scale a resolution of the first video sequence according to scaling parameter information associated with the video source, and a scaled first video sequence is referred to as a second video sequence. The scaling parameter information in this embodiment of the present disclosure may include one resolution or a plurality of resolutions and the specific amount of the scaling parameter information is not limited herein. The plurality of resolutions may include resolutions such as 1080p, 720p, 540p, and 270p.

In this embodiment of the present disclosure, a transcoding operation on the first video sequence at one resolution may be referred to as one-path transcoding, and a transcoding operation on the first video sequence at the plurality of resolutions may be referred to as multi-transcoding. In the distributed transcoding system, each first server in the distributed cluster may multi-transcode the obtained first video sequence according to a plurality of pieces of scaling parameter information associated with the video source to obtain a transcoded bit stream associated with each piece of scaling parameter information. One piece of scaling parameter information is one resolution. Further, in this embodiment of the present disclosure, the transcoded bit stream associated with each resolution may be uniformly referred to as an encoded bit stream (that is, the encoded video sequence). One encoded bit stream is obtained by encoding a to-be-encoded video sequence at an encoding bit rate predicted by a prediction model associated with one resolution (that is, the scaling parameter information). One to-be-encoded video sequence is obtained after scaling, by the first server, the resolution of the first video sequence according to one piece of scaling parameter information.

In certain embodiment(s), the term "to-be-encoded video sequence" is interchangeable with the term "video sequence."

The other servers in the same distributed network as the server 20d may include a server 20a, a server 20b, a server 20c, and the like. In addition, in this embodiment of the present disclosure, the other servers (the server 20a, the server 20b, the server 20c, and the like) in the same distributed network as the server 20d (that is, the second server) may be uniformly referred to as first servers. The video data processing apparatus 2000 may be operated in each of these first servers, so that these first servers that have received the first video sequence each may multi-transcode the received first video sequence by using the video data processing apparatus 2000, so as to quickly obtain a plurality paths of multi-transcoded bit streams associated with the first video sequence.

In the video-on-demand scene, in this embodiment of the present disclosure, by providing a plurality of transcoded bit streams associated with different resolutions, after obtaining of an on-demand request from another user terminal (for example, the user terminal 3000n shown in FIG. 1) associated with the second server, according to a resolution supported by the user terminal 3000n, an encoded bit stream (for example, an encoded bit stream 1) that matches the resolution of the user terminal 3000n may be quickly found, and the found encoded bit stream 1 may be transmitted to the user terminal 3000n, to effectively ensure the quality of played video data during video playback of decoded encoded bit stream 1 in the user terminal 3000n, thereby improving the video playback effect.

In this embodiment of the present disclosure, after the service server (for example, the server 20d) identifies that the obtained raw video data is live video data, the server 20d may determine that the service scene to which the raw video data pertains is a video live scene, and in this time, it is difficult for the server 20d to directly slice the received raw video data (that is, the video source). Therefore, to improve the efficiency of multi-transcoding, in the video live scene, a part of the live video data in the received raw video data (that is, the video source) may be cached by using a buffer in this embodiment of the present disclosure, and a video sequence of a specific sequence length obtained by caching may be uniformly referred to as a cached video sequence. Further, the server 20d may perform scene shear detection on the cached video sequence of the specific sequence length while obtaining the video source, so as to locate, in the cached video sequence, a to-be-encoded video sequence on which video encoding may need to be performed, thereby ensuring the accuracy of video encoding in the video live scene.

In this embodiment of the present disclosure, a $1^{st}$ video frame of the cached video sequence that updates dynamically in the buffer may be uniformly referred to as a key video frame. In this embodiment of the present disclosure, the specific sequence length of the cached video sequence that updates dynamically in the buffer may be uniformly referred to as a cached sequence length (for example, 50 frames). Further, the server 20d (that is, the service server) may perform scene shear detection on the cached video sequence having the cached sequence length to find, from the cached video sequence, another key video frame in which scene shear exists. Video sequences between the two key video frames may be referred to as a to-be-encoded video sequence, to perform the video data processing function on the to-be-encoded video sequence in the video live scene by the video data processing apparatus 2000 that is operated in the server 20d, so that the server 20d outputs a multi-transcoded bit stream.

For ease of understanding, in this embodiment of the present disclosure, an implementation in which the obtained raw video data is on-demand video data is used as an example, to describe the specific process of transcoding a plurality of video segments of the on-demand video data (for example, a video A) in a distributed manner in the distributed transcoding system. In the video-on-demand scene, the raw video data obtained by the second server may be video data uploaded live by a user terminal, or may alternatively be on-demand video data obtained from a service database (for example, the first transcoding database), and the specific manner of obtaining the on-demand video data is not limited herein. In the distributed transcoding system, the service server (that is, the second server) may distribute one of the plurality of video segments after slicing to one transcoding server (that is, the first server), for multi-transcoding in the transcoding server.

Figure 2:
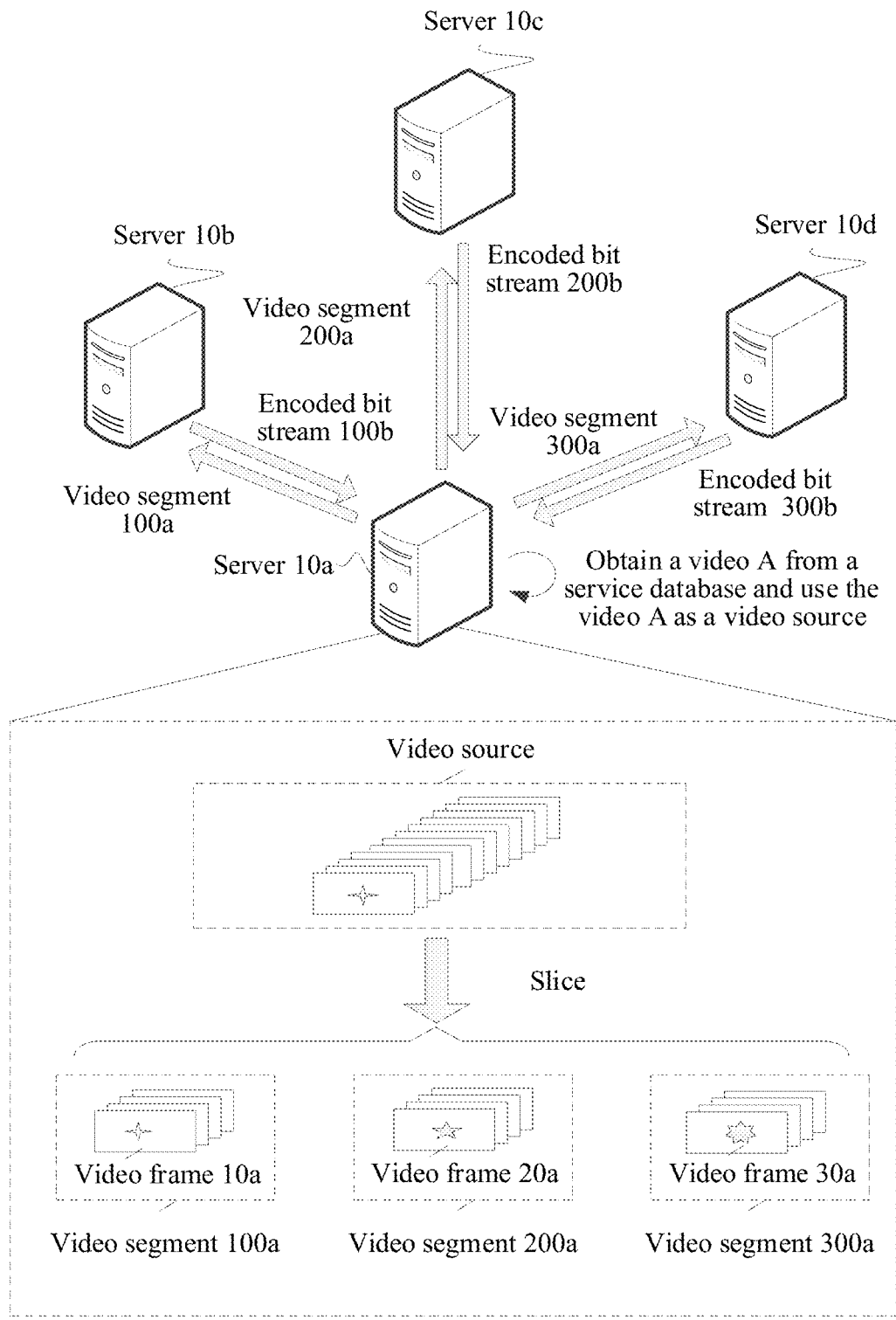
FIG. 2 is a schematic diagram of a scene of distributed transcoding according to embodiment(s) of the present disclosure.

Further, FIG. 2 is a schematic diagram of a scene of distributed transcoding according to an embodiment of the present disclosure. A server 10a shown in FIG. 2 may be the service server, and in a distributed transcoding system, the service server may be the second server in the video-on-demand scene. As shown in FIG. 2, after obtaining of a video A from a service database shown in FIG. 2, the second server (that is, the server 10a shown in FIG. 2) may use the video A as a video source. Since the video source is on-demand video data in the video-on-demand scene, the server 10a may slice the video source directly in the first slice segmentation rule to obtain a plurality of video segments (that is, a plurality of first video sequences) shown in FIG. 2. As shown in FIG. 2, the plurality of first video sequences may include a video segment 100a, a video segment 200a, and a video segment 300a.

Before multi-transcoding these first video sequences (that is, the video segments), the server 10a may further configure, for each video segment, a corresponding quality type and a video quality parameter corresponding to the quality type. The quality type in this embodiment of the present disclosure may include at least one of the following: a first quality type, a second quality type, a third quality type, and a fourth quality type. All of the four quality types can be used to evaluate the video quality of video images in the corresponding video segments, and in this embodiment of the present disclosure, scores obtained through evaluation may be uniformly referred to as video quality parameters in the corresponding quality types.

The first quality type may be a Video Multi-Method Assessment Fusion (VMAF) type. The video quality standard parameter in the VMAF type (referring to a quality evaluation value set in the VMAF type herein) configured by the second server (that is, the service server) for the first video sequence may be any one of values in a range of 0 to 100, for example, VMAF 90. A greater value of the quality evaluation value set in the VMAF type indicates a better video quality of a finally outputted encoded bit stream.

The second quality type may be a Structural Similarity (SSIM) type. The video quality standard parameter in the SSIM type (referring to a quality evaluation value set in the SSIM type herein) configured by the second server (that is, the service server) for the first video sequence may be any one of values in a range of 0 to 1, for example, SSIM 0.987. A greater value of the quality evaluation value set in the SSIM type indicates a better video quality of a finally outputted encoded bit stream.

The third quality type may be a Peak Signal to Noise Ratio (PNSR) type. The video quality standard parameter in the PNSR type (referring to a quality evaluation value set in the PNSR type herein) configured by the second server (that is, the service server) for the first video sequence may be any one of values in a range of 0 to 100, for example, PNSR 40.

The fourth quality type may be a Mean Opinion Score (MOS) type. The video quality standard parameter in the MOS type (referring to a quality evaluation value set in the MOS type herein) configured by the second server (that is, the service server) for the first video sequence may be any one of values in a range of 1 to 5, for example, MOS 4.

The server 10a (that is, the second server) in this embodiment of the present disclosure may configure a quality type for each video segment during distributing of each video segment shown in FIG. 2 to a corresponding first server, and in this embodiment of the present disclosure, the quality type configured for each video segment may be uniformly referred to as a target quality type. For example, the target quality type configured by the server 10a for the video segment 100a may be the VMAF type, the target quality type configured by the server 10a for the video segment 200a may be the SSIM type, and the target quality type configured by the server 10a for the video segment 300a may be the PSNR type. In this embodiment of the present disclosure, the server 10a may alternatively configure the same quality type for each video segment obtained after slicing, for example, may configure any one of the plurality of quality types for the video segment 100a, the video segment 200a, and the video segment 300a shown in FIG. 2.

In this embodiment of the present disclosure, a video quality parameter in a quality type configured by the server 10a for a video segment may be used as a video quality standard parameter of a to-be-encoded video sequence associated with the video segment, and an encoding bit rate for encoding the to-be-encoded video sequence may further be predicted, based on the video quality standard parameter of the target quality type, by a prediction model corresponding to the target quality type.

For ease of understanding, in this embodiment of the present disclosure, an implementation in which the video quality parameter in the target quality type configured by the server 10a for the plurality of video segments (that is, the video segment 100a, the video segment 200a, and the video segment 300a) shown in FIG. 2 is VMAF 90 is used as an example. As shown in FIG. 2, after the second server (for example, the server 10a shown in FIG. 2) slices a video source into three video segments shown in FIG. 2, the server 10a may select, from a distributed cluster where the server 10a is located, three servers (for example, a server 10b, a server 10c, and a server 10d shown in FIG. 2) as the first servers, to respectively distribute the three video segments shown in FIG. 2 to the three first servers for multi-transcoding, so as to improve the efficiency of multi-transcoding each video segment of the video source in the distributed transcoding system.

For ease of understanding, in this embodiment of the present disclosure, an implementation in which the server 10a distributes the video segment 100a after slicing to the server 10b shown in FIG. 2 is used as an example, to describe the specific process of multi-transcoding in the server 10a. After obtaining the first video sequence (for example, the video segment 100a) distributed by the server 10a (that is, the second server), the server 10b (that is, the first server) may synchronously obtain the video quality parameter (that is, the VMAF 90) of the VMAF type configured by the server 10a for the first video sequence and may use the VMAF 90 as the video quality standard parameter of the to-be-encoded video sequence.

After obtaining the first video sequence (that is, the video segment 100a), the server 10b may scale a resolution (for example, 540p) of the video segment 100a according to scaling parameter information (for example, 1080p, 720p, 540p, 270p) associated with the video source, and a scaled first video sequence may be referred to as a second video sequence. A quantity of the second video sequences is the same as a quantity of pieces of the scaling parameter information, that is, the resolutions of the second video sequences may include 1080p, 720p, 540p, 270p. For ease of understanding, in this embodiment of the present disclosure, an implementation in which the resolution of the second video sequence is 720p is used as an example, and the second video sequence having a target resolution (that is, 720p) is used as the to-be-encoded video sequence, to further describe the specific process of transcoding the to-be-encoded video sequence associated with the target resolution (that is, 720p) in the server 10*b*.

In other words, in this embodiment of the present disclosure, a second video sequence associated with a target resolution may be uniformly referred to as a to-be-encoded video sequence, a pre-encoding process is performed on the to-be-encoded video sequence, and encoding information stored in the pre-encoding process is referred to as a video feature corresponding to the to-be-encoded video sequence. Further, the server 10*b* may further find, from a prediction model library, a prediction model (for example, a prediction model 1) that matches the VMAF type, to predict by using the prediction model 1 an encoding bit rate of the to-be-encoded video sequence based on a specific video quality, and may further encode the to-be-encoded video sequence according to the predicted encoding bit rate to obtain an encoded bit stream 100*b* shown in FIG. 2.

The specific process of transcoding the video segment 100*a* at another resolution (for example, a resolution of 1080p or the like) may be referred to the specific process of transcoding the video segment at the target resolution (that is, 720p), which is not described herein again. The specific process of multi-transcoding another video segment (for example, the video segment 100*b* or the video segment 300*a*) shown in FIG. 2 may be referred to the specific process of multi-transcoding the video segment 100*a*, which is not described herein again.

Each quality type in this embodiment of the present disclosure may correspond to a trained prediction model, through which an encoding bit rate of a to-be-encoded video sequence at a specific resolution and based on a specific video quality can be predicted, and further the to-be-encoded video sequence may be encoded based on the predicted encoding bit rate to obtain an encoded bit stream associated with the corresponding resolution.

The specific implementation for the first server to obtain the to-be-encoded video sequence, obtain the video feature of the to-be-encoded video sequence through pre-encoding, and predict the encoding bit rate based on the video feature may be referred to the embodiments corresponding to FIG. 3 to FIG. 9 in the following.

Figure 3:
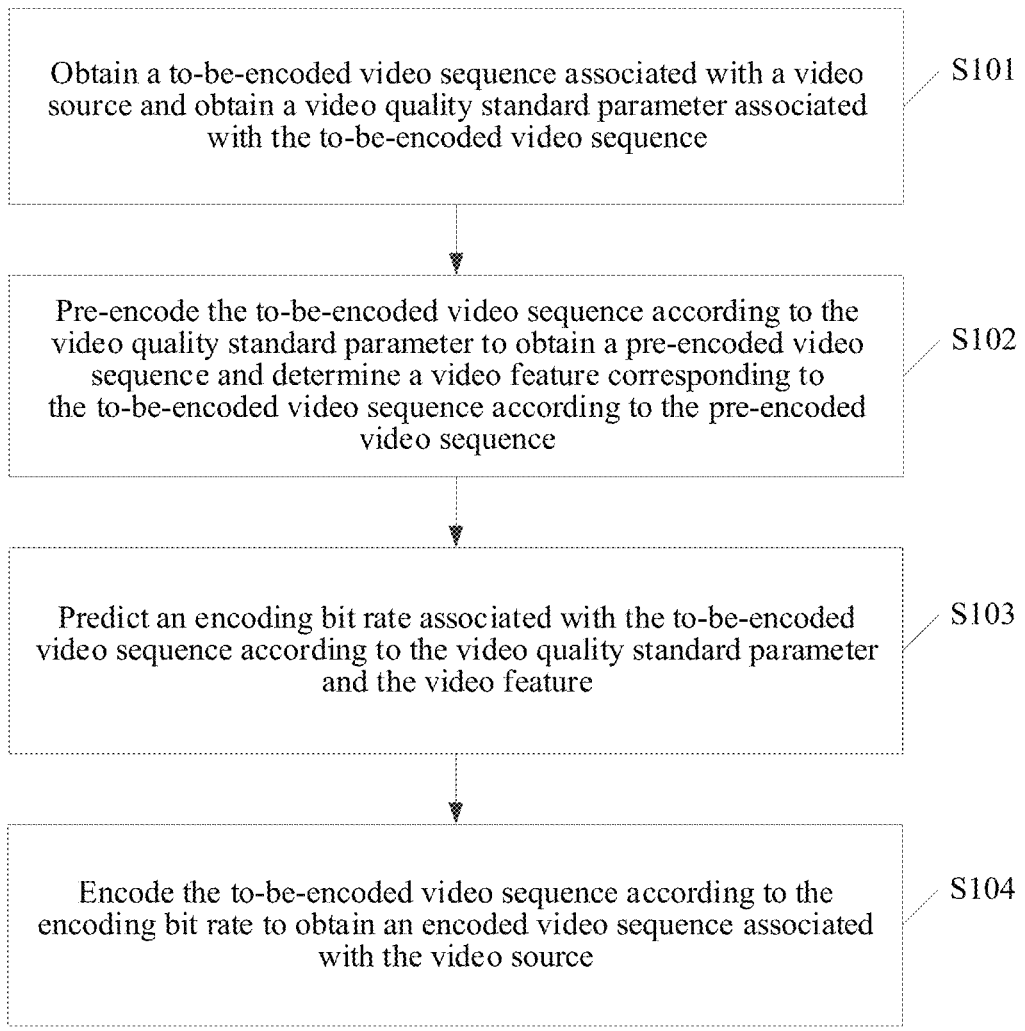
FIG. 3 is a schematic flowchart of a video data processing method according to embodiment(s) of the present disclosure.

Further, FIG. 3 is a schematic flowchart of a video data processing method according to an embodiment of the present disclosure. As shown in FIG. 3, the method may be performed by a video data processing apparatus having a video data processing function and the method may include at least step S101 to step S104:

Step S101: Obtain a to-be-encoded video sequence associated with a video source and obtain a video quality standard parameter associated with the to-be-encoded video sequence.

Further, in a video-on-demand scene, the video data processing apparatus may receive a first video sequence of the video source and distributed by a service server in the video-on-demand scene. The first video sequence may be determined by the service server after slicing the obtained video source. Further, the video data processing apparatus may determine the to-be-encoded video sequence associated with the video source according to scaling parameter information of the video source and the first video sequence. Further, the video data processing apparatus may use a video quality parameter configured by the service server for the first video sequence as the video quality standard parameter associated with the to-be-encoded video sequence.

The video data processing apparatus in this embodiment of the present disclosure may be operated in the first server, which may be the server 10*b* in the embodiment corresponding to FIG. 2. The first server may be a distributed server in a distributed transcoding system. In the distributed transcoding system, the service server may be another distributed server (that is, the second server) in the same distributed network as the first server. The second server in this embodiment of the present disclosure may slice the obtained video source in a slice segmentation rule, so as to slice the obtained video source into a plurality of video segments. In this embodiment of the present disclosure, each video segment may be uniformly referred to as a first video sequence. To improve the efficiency of multi-transcoding these sliced video segments (that is, the first video sequences), in this embodiment of the present disclosure, the first video sequences may further be distributed to the first servers associated with the second server, so that the video data processing apparatus (for example, the video data processing apparatus 2000) that is operated in each first server multi-transcodes the obtained first video sequence to ensure the accuracy of video encoding for each video segment. In addition, by synchronously multi-transcoding the to-be-encoded video sequence of each video segment in these first servers, the efficiency of multi-transcoding the video source can also be improved. The specific process for the second server to slice the video source into a plurality of video segments may be referred to the description of the first slice segmentation rule in the video-on-demand scene in the embodiment corresponding to FIG. 2, which is not described herein again.

In the distributed transcoding system, the service server (that is, the second server) may receive a large number of videos uploaded by user terminals through browser web pages or target clients every day, and these videos may include video data 1 (that is, the on-demand video data) in a video-on-demand scene and may also include video data 2 (that is, the live video data) in a video live scene. In this embodiment of the present disclosure, the video data 1 and video data 2 received by the service server may be uniformly referred to as the raw video data, that is, one piece of raw video data may be one piece of video source.

After determining that the obtained raw video data is on-demand video data, the service server (that is, the second server in the distributed server) may directly use the obtained on-demand video data as the video source for slicing and distribute sliced video segments to other service servers (that is, the first servers) in the same distributed network as the service server. After obtaining a first video sequence distributed by the second server, each first server may scale the first video sequence according to scaling parameter information of the video source (that is, the on-demand video data) and determine a scaled first video sequence as a second video sequence. A quantity of the second video sequences is the same as a quantity of pieces of the scaling parameter information of the video source. Therefore, in the video-on-demand scene, a quantity of to-be-encoded video sequences obtained by the first servers determines a quantity of paths of subsequent video transcoding.

For ease of understanding, in this embodiment of the present disclosure, one service server in the distributed transcoding system is used as an example, to describe the specific process for the first server in which the video data processing apparatus is operated to multi-transcode the obtained video segment. The first server in which the video data processing apparatus is operated may be the server 10*c* in the embodiment corresponding to FIG. 2. The video segment obtained by the first server (that is, the server 10*c*) may be the video segment 300*a* distributed by the server 10*a*

Figure 4:
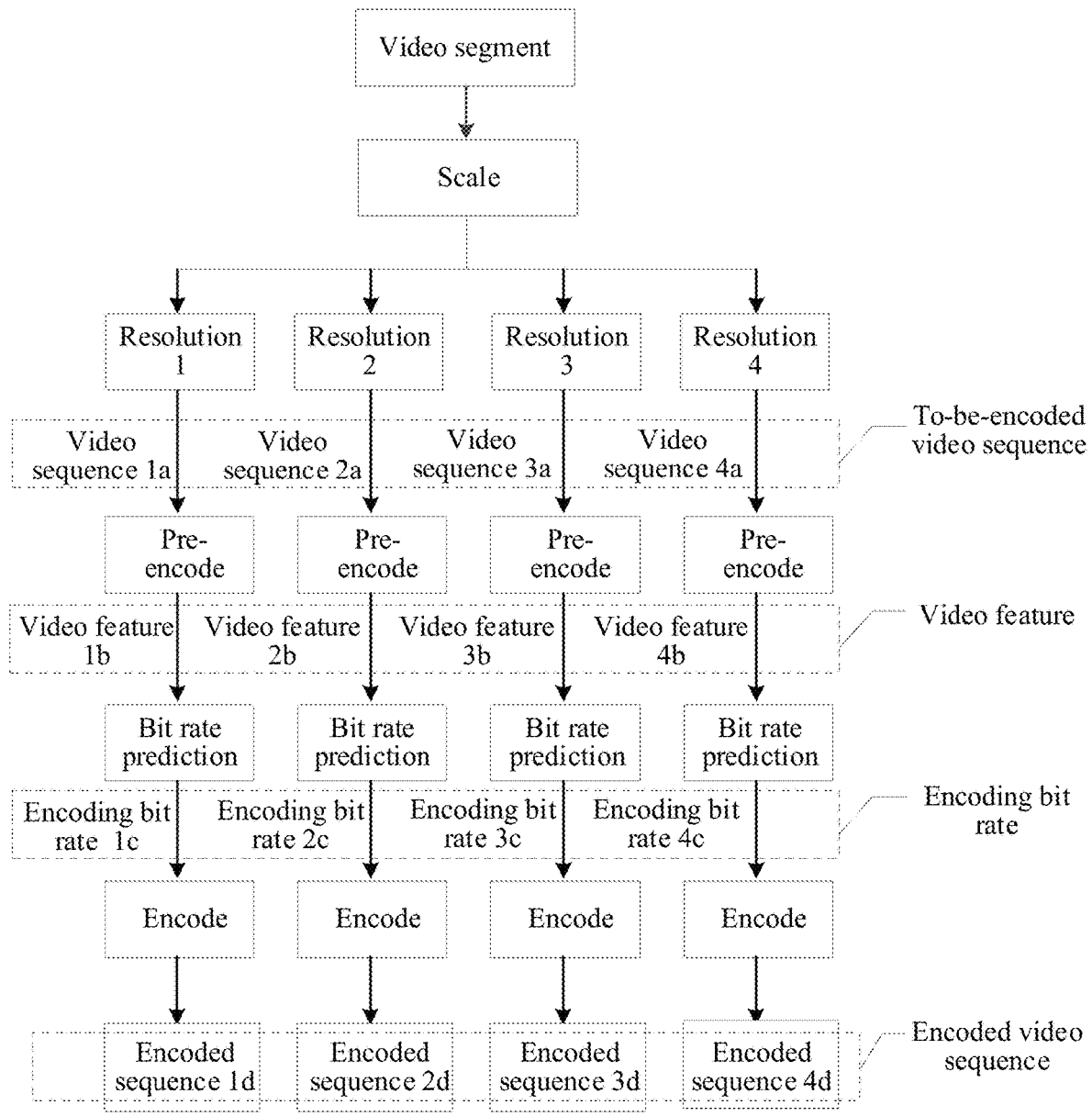
FIG. 4 is a schematic diagram of a scene of obtaining a video sequence in a video-on-demand scene according to embodiment(s) of the present disclosure.

(that is, the second server) in the embodiment corresponding to FIG. 2. Further, FIG. 4 is a schematic diagram of a scene of obtaining a to-be-encoded video sequence in a video-on-demand scene according to an embodiment of the present disclosure. The video segment obtained by the first server (that is, the server 10d) may be the video segment 300a. In the video-on-demand scene, the video segment 300a of the video source and distributed by the second server may be uniformly referred to as a first video sequence in this embodiment of the present disclosure. After obtaining the video segment 300a (that is, the first video sequence), the first server may scale a resolution of the video segment 300a (that is, the first video sequence) according to scaling parameter information associated with a resolution of the video source. As shown in FIG. 4, the first server may scale the resolution (for example, 540p) of the first video sequence to a plurality of resolutions shown in FIG. 4. The plurality of resolutions herein may be a resolution 1, a resolution 2, a resolution 3, and a resolution 4. The resolution 1 may be the 1080p, the resolution 2 may be the 720p, the resolution 3 may be the 540p, and the resolution 4 may be the 270p. The scaling parameter information associated with the resolution of the video source may be the plurality of resolutions, that is, one piece of the scaling parameter information may correspond to one resolution. Encoded bit streams corresponding to any two resolutions of the plurality of resolutions may be switched between each other. For example, for a user terminal in the video-on-demand scene, the second server may quickly find and distribute, according to a bit stream switching request of an on-demand user using the user terminal, encoded bit streams of the same video segment with the same video content at different resolutions, to quickly switch between the corresponding encoded bit streams while ensuring the video playback quality, thereby improving the encoding efficiency and reducing a playback delay.

In the video-on-demand scene, in this embodiment of the present disclosure, one second video sequence obtained according to one piece of scaling parameter information (that is, one resolution) may be used as one to-be-encoded video sequence associated with the video source, so that the following step S102 to step S104 may be performed on each to-be-encoded video sequence based on a video quality standard parameter of a specific quality type.

In this embodiment of the present disclosure, video sequences of the same video segment at different resolutions may be referred to as second video sequences. The second video sequences may include a video sequence 1a obtained after the video segment 300a is scaled to the resolution 1, a video sequence 2a obtained after the video segment 300a is scaled to the resolution 2, a video sequence 3a obtained after the video segment 300a is scaled to the resolution 3, and a video sequence 4a obtained after the video segment 300a is scaled to the resolution 4. In this embodiment of the present disclosure, the video sequence 1a, the video sequence 2a, the video sequence 3a, and the video sequence 4a in the second video sequences may be uniformly referred to as to-be-encoded video sequences, and multi-transcoding is performed on these to-be-encoded video sequences in the first server (that is, the server 10d). The multi-transcoding herein refers to four paths of transcoding associated with the four resolutions, so that the transcoded bit streams of the same video segment at different resolutions can be obtained through the following step S102 to step S104. These transcoded bit streams may include an encoded sequence 1d associated with the resolution 1, an encoded sequence 2d associated with the resolution 2, an encoded sequence 3d associated with the resolution 3, and an encoded sequence 4d associated with the resolution 4 shown in FIG. 4.

The service server may determine a service scene to which the obtained raw video data (that is, the video source) pertains, and then determine, according to the determined service scene to which the raw video data pertains, whether the obtained video source can be sliced directly. The service scene herein may include the video-on-demand scene and may also include a video live scene.

In the video live scene, the service server (that is, the second server) may obtain raw video data periodically acquired and transmitted by a user terminal (referring to a terminal device capable of acquiring an image, for example, an anchor terminal), and in this implementation, the raw video data obtained by the service server may be live video data.

After determining that the obtained raw video data is live video data, the service server may determine received raw video data (that is, the live video data) as the video source, and may further perform, in second slice segmentation rule (for example, scene detection rule), scene shear detection on an updated cached video sequence in a buffer, to find, from the cached video sequence currently cached in the buffer, a scene shear frame by which one scene (for example, a scene 1) is sheared to another scene (for example, a scene 2). In this embodiment of the present disclosure, a sequence number of the scene shear frame in the current cached video sequence may be referred to as a scene shear point, and further the currently cached video may be divided into a plurality of scenes according to found scene shear points. Each scene in this embodiment of the present disclosure may correspond to one key video frame, and in this embodiment of the present disclosure, a video sequence between any two scenes may be referred to as a to-be-encoded video sequence to be transmitted to an encoder. In this embodiment of the present disclosure, the to-be-encoded video sequence associated with the video source and determined by the service server (that is, the second server) in the second slice segmentation rule may include one key video frame. In this implementation, the service server (that is, the second server) may perform the following step S102 to step S104 on the to-be-encoded video sequence by using the video data processing apparatus.

Hence, in the video live scene, the second server in which the video data processing apparatus is operated may directly transcode the obtained to-be-encoded video sequence in the second slice segmentation rule, so as to obtain the to-be-encoded video sequence (that is, the encoded bit stream) associated with the video source. The encoded bit stream in the video live scene may be distributed by the service server (that is, the second server) to other user terminals (for example, audience terminals) in the same virtual live room as the anchor terminal, to ensure that the other user terminals can decode the obtained encoded bit stream by using a corresponding decoder, so as to synchronously play the live video data acquired by the anchor terminal in the other user terminals.

The service server configured to multi-transcode the video source in the video live scene may be any distributed server in the distributed transcoding system, and the distributed server configured to obtain the live video data is not limited herein.

For ease of understanding, this embodiment of the present disclosure, the implementation in which the video source obtained by the service server is on-demand video data in a video-on-demand scene is used as an example, to describe the specific process for the first server in which the video data processing apparatus is operated to multi-transcode the to-be-encoded video sequence associated with the video source.

Step S102: Pre-encode the to-be-encoded video sequence according to the video quality standard parameter to obtain a pre-encoded video sequence and determine a video feature corresponding to the to-be-encoded video sequence according to the pre-encoded video sequence.

Further, the video data processing apparatus obtains, according to the video quality standard parameter, an initial encoder configured to pre-encode the to-be-encoded video sequence. Further, the video data processing apparatus may pre-encode the to-be-encoded video sequence according to the initial encoder to obtain the pre-encoded video sequence. The pre-encoded video sequence may include key video frames and predicted video frames. Further, the video data processing apparatus may determine encoding information of the pre-encoded video sequence according to the key video frames, the predicted video frames, a resolution of the pre-encoded video sequence, and a bit rate of the pre-encoded video sequence. Further, the video data processing apparatus may determine the encoding information as the video feature corresponding to the to-be-encoded video sequence.

For ease of understanding, in this embodiment of the present disclosure, an implementation in which a resolution of the video segment shown in FIG. 4 (for example, the video segment 300*a*) is scaled to the resolution 1 is used as an example, to describe the specific process of transcoding the video sequence 1*a* shown in FIG. 4 (that is, the to-be-encoded video sequence) in one path. As shown in FIG. 4, the first server in which the video data processing apparatus is operated may synchronously obtain, after obtaining the to-be-encoded video sequence (that is, the video sequence 1*a* shown in FIG. 4), a video quality parameter configured by the second server for the video segment 300*a*, and use the video quality parameter configured by the second server for the video segment 300*a* as the video quality standard parameter (for example, the VMAF 90) of the to-be-encoded video sequence.

The first server may obtain, according to the video quality standard parameter (for example, the VMAF 90), the initial encoder for pre-encoding the video sequence 1*a* by a user, and may pre-encode the to-be-encoded video sequence according to the initial encoder to obtain a pre-encoded video sequence. The pre-encoded video sequence may include key video frames and predicted video frames. One pre-encoded video sequence may include one key video frame and at least one predicted video frame. Further, the first server may quickly determine encoding information of the pre-encoded video sequence according to the key video frame, the predicted video frame, a resolution of the pre-encoded video sequence, and a bit rate of the pre-encoded video sequence, and may determine the encoding information as the video feature corresponding to the to-be-encoded video sequence. As shown in FIG. 4, the first server stores the encoding information obtained during pre-encoding of the video sequence 1*a* (that is, the to-be-encoded video sequence), and may use the stored encoding information of the pre-encoded video sequence as the video feature of the video sequence 1*a*. The video feature of the video sequence 1*a* may be a video feature 1*b* shown in FIG. 4.

When or in response to determining that the pre-encoded video sequence includes forward predicted frames (that is, a P frames), a specific process for the first server to obtain encoding information of an encoded video sequence may include the following steps: The first server may obtain a key video frame selected during inter-frame compression of the forward predicted frames and may determine the selected key video frame as a reference video frame corresponding to the forward predicted frame. Further, the first server may determine a total quantity of selected reference video frames as a first quantity, may determine a total quantity of key video frames as a second quantity, and may determine a total quantity of forward predicted frames as a third quantity. Further, the first server may determine a first average data capacity of the key video frames according to data capacities corresponding to the key video frames and the second quantity and determine a second average data capacity of the forward predicted frames according to data capacities corresponding to the forward predicted frames and the third quantity. Further, the first server may obtain a maximum data capacity from the data capacities corresponding to the key video frames, determine a ratio of the first average data capacity to the maximum data capacity as a spatial complexity of the pre-encoded video sequence, and determine a ratio of the second average data capacity to the first average data capacity as a temporal complexity of the pre-encoded video sequence. Further, the first server may determine the first quantity, the second quantity, the third quantity, the spatial complexity, the temporal complexity, the resolution of the pre-encoded video sequence, and the bit rate of the pre-encoded video sequence as the encoding information of the pre-encoded video sequence.

In the video-on-demand scene, the first server in which the video data processing apparatus is operated may perform pre-encoding on the video sequence 1*a* (that is, the to-be-encoded video sequence) shown in FIG. 4, and store encoding information of the pre-encoded video sequence associated with the video sequence 1*a* during the pre-encoding of the video sequence 1*a*. Different types of encoded video frames can be obtained by using different compression methods in the process of pre-encoding the video sequence 1*a*. For example, I frames (that is, Intra coded frames) may be obtained through intra encoding, and P frames (that is, forward predicted frames) and B frames (that is, bi-directional predicted frames) may be obtained through inter-frame encoding. In this embodiment of the present disclosure, the I frames obtained through intra encoding may be uniformly referred to as the key video frames, and the P frames or the B frames may be uniformly referred to as the predicted video frames.

In this embodiment of the present disclosure, a spatial correlation may be used for encoding within a single video frame of the video sequence 1*a* to output an I frame. That is, in the process of intra-frame compression, there may not be a need to consider the temporal correlation and motion compensation. In addition, the I frame obtained after encoding may further be used as a reference frame for subsequent video decoding. An I-frame image may appear periodically in the video sequence 1*a* and a frequency of occurrence may be determined by an insertion cycle of the initial encoder. A frame group associated with the to-be-encoded video sequence (that is, the video sequence 1*a*) may be determined according to the insertion cycle, and one frame group may be regarded as one scene.

A P frame (that is, a P-frame image) and a B frame (that is, a B-frame image) may be compressed by inter-frame encoding, that is, the spatial and temporal correlations may be both used. For example, forward time prediction may be used for the P-frame image to improve the compression efficiency and the image quality. Each macroblock in the P frame image may be obtained after forward prediction based on an I frame closest to the P frame (the I frame may be regarded as a reference video frame herein). The B-frame image is obtained through bi-directional temporal prediction, that is, for the B-frame image, an I-frame image or a P-frame image closest to the B frame may be used as another reference video frame for the bi-directional prediction. For example, the B-frame image may use a future frame (that is, an encoded P frame or I frame that is adjacent and closest to the B frame and after the B-frame image) as the reference video frame. Therefore, in the process of pre-encoding the video frames in the to-be-encoded video sequence by the initial encoder, the transmission order and display order of the encoded video frames displayed in each frame group are different. For example, in the pre-encoded video sequence corresponding to the video sequence 1a, the display order (that is, the encoding order) of the encoded video frames may be: I-B-B-P. However, considering that decoding of the forward predicted frame, P frame, may need to depend on the I frame and during decoding of a bi-directional predicted frame (that is, the B frame), it may be necessary to know information of the P frame and the I frame, the decoding order of these frames in the pre-encoded video sequence may be: I-P-B-B. Therefore, by pre-encoding the video sequence 1a, the encoding information of the pre-encoded video sequence can be quickly obtained through statistics. The encoding information of the pre-encoded video sequence associated with the video sequence 1a (the to-be-encoded video sequence) may include key encoding information of the pre-encoded video sequence, the spatial complexity of the pre-encoded video sequence, the temporal complexity of the pre-encoded video sequence, and the like. The key encoding information of the pre-encoded video sequence may include the resolution of the pre-encoded video sequence, the bit rate, the quantity of the key video frames, the quantity of the predicted video frames, the quantity of the reference frames, and the like.

The resolution of the pre-encoded video sequence may be the resolution 1. The bit rate of the pre-encoded video sequence may be the bit rate counted directly during the pre-encoding. The video sequence 1a may include a plurality of scenes, each of which may correspond to a key video frame and at least one predicted video frame. The at least one predicted video frame herein may be a P frame (that is, a forward predicted frame). In this embodiment of the present disclosure, the key video frame used in inter-coding of the forward predicted frames (that is, the P frames) may be uniformly referred to as a reference video frame. In this embodiment of the present disclosure, during the pre-encoding, every time a key video frame is used, a quantity of reference video frames may be added by 1, and a total quantity of the selected reference video frames finally counted after the pre-encoding is performed may be determined as a first quantity. In addition, in this embodiment of the present disclosure, a quantity of key video frames counted during the pre-encoding (that is, a total quantity of key video frames) may be uniformly referred to as a second quantity, and a quantity of forward predicted frames counted during the pre-encoding (that is, a total quantity of forward predicted frames) may be uniformly referred to as a third quantity.

Further, the first server may further calculate the spatial complexity of the pre-encoded video sequence through the following formula (1):

Spatial complexity=Average size of $I$ frames/Size of maximum $I$ frame    formula (1).

The average size of I frames is determined by the data capacities (for example, 100 kB, 90 kB, or the like) corresponding to each key video frame obtained by the first server and the total quantity of I frames counted thereby. In this embodiment of the present disclosure, a first average data capacity of these key video frames may be determined based on the data capacities corresponding to all the key video frames and the total quantity of the key video frames that is counted by the first server (that is, the second quantity), and the first average data capacity may be uniformly referred to as the average size of the I frames. In addition, in this embodiment of the present disclosure, a key video frame with a maximum data capacity may be found based on the data capacities corresponding to the key video frames, the found key video frame having the maximum data capacity may be referred to as a maximum I frame, and the size of the maximum I frame is the maximum data capacity among the data capacities corresponding to the key video frames. Therefore, in this embodiment of the present disclosure, a ratio of the first average data capacity to the maximum data capacity may be used as the spatial complexity of the pre-encoded video sequence according to the formula (1).

Further, the first server may further calculate the temporal complexity of the pre-encoded video sequence through the following formula (2):

Temporal complexity=Average size of $P$ frames/Average size of $I$ frames    formula (2).

The average size of P frames refers to a data capacity (for example, 20 kB, 15 kB, or the like) corresponding to each forward predicted frame obtained by the first server. In this embodiment of the present disclosure, a second average data capacity of these forward predicted frames may be determined based on the data capacities corresponding to all the forward predicted frames and the total quantity of the forward predicted frames that is counted by the first server (that is, the third quantity), and in this embodiment of the present disclosure, the second average data capacity may be uniformly referred to as the average size of the P frames. As shown in the formula (2), in this embodiment of the present disclosure, a ratio of the second average data capacity to the first average data capacity may be used as the temporal complexity of the pre-encoded video sequence.

The specific process for the first server to pre-encode the video sequence 2a, the video sequence 3a, and the video sequence 4a shown in FIG. 4 may be referred to the specific process of pre-encoding the video sequence 1a, which is not described herein again Step S103: Predict an encoding bit rate associated with the to-be-encoded video sequence according to the video quality standard parameter and the video feature.

Further, the video data processing apparatus may obtain a target quality type (that is, the VMAF type) corresponding to the video quality standard parameter (for example, the VMAF 90) and may use a prediction model that is in a prediction model library associated with a plurality of quality types and that matches the target quality type as the target prediction model. Further, the video data processing apparatus may input the video feature to the target prediction model which then outputs matching degrees between the video feature and a plurality of reference video features in the target prediction model. Further, the video data processing apparatus may use a reference video feature having the highest degree of matching with the video feature as a target reference video feature, and further may use sample bit rate information corresponding to quality tag information associated with the target reference video feature as the encoding bit rate associated with the to-be-encoded video sequence.

In the distributed transcoding system, after obtaining the video feature 1b of the to-be-encoded video sequence (for example, the video sequence 1a), the first server in which the video data processing apparatus is operated may input the video feature 1b to a target prediction model that matches the VMAF type. In this implementation, the target prediction model may predict, according to the specific set quality index (that is, the video quality standard parameter), the encoding bit rate for encoding the to-be-encoded video sequence, to further perform the following step S104.

For to-be-encoded video sequences of the same video segment with the same video content at different resolutions shown above in FIG. 4, an encoding bit rate associated with each to-be-encoded video sequence may be predicted by using the same target prediction model. For example, the encoding bit rate of the video sequence 1a may be the encoding bit rate 1c shown in FIG. 4, the encoding bit rate of the video sequence 2a may be the encoding bit rate 2c shown in FIG. 4, the encoding bit rate of the video sequence 3a may be the encoding bit rate 3c shown in FIG. 4, and the encoding bit rate of the video sequence 4a may be the encoding bit rate 4c shown in FIG. 4.

Step S104: Encode the to-be-encoded video sequence according to the encoding bit rate to obtain an encoded video sequence associated with the video source.

As shown in FIG. 4, during transcoding of the to-be-encoded video sequences at different resolutions in this embodiment of the present disclosure, the encoding bit rates of the same video segment with the same video content at different resolutions may be predicted by using the same target prediction model, and further the plurality of to-be-encoded video sequences shown in FIG. 4 may be encoded according to the plurality of predicted encoding bit rates, to output encoded video sequences associated with the corresponding resolutions. The encoded video sequences may include the encoded sequence 1d, the encoded sequence 2d, the encoded sequence 3d, and the encoded sequence 4d shown in FIG. 4. In this embodiment of the present disclosure, the encoded video sequence associated with each resolution may be uniformly referred to as an encoded bit stream.

The target quality type in this embodiment of the present disclosure may be any one of the plurality of quality types, each of which may correspond to one prediction model, and these prediction models may be stored in the prediction model library of the distributed transcoding system. Therefore, after the first server in which the video data processing apparatus is operated obtains the target evaluation value based on the set quality index, the target evaluation value based on the set quality index may be uniformly referred to as the video quality standard parameter, so that the first server may directly adjust, according to the video quality standard parameter of the set target quality type, an output quality of the encoded sequence to be outputted. In other words, for each first server in the distributed transcoding system, when or in response to determining that the video segments obtained by each of the first servers are different, encoding bit rates for encoding the corresponding video segments are properly found for each first server as far as possible while ensuring that the video quality is relatively consistent, thereby resolving the problem of bandwidth waste caused by indiscriminately encoding of these video segments by using the same encoding bit rate, reducing waste in encoding bit rates, and further achieving the purpose of saving bandwidth.

Figure 5:
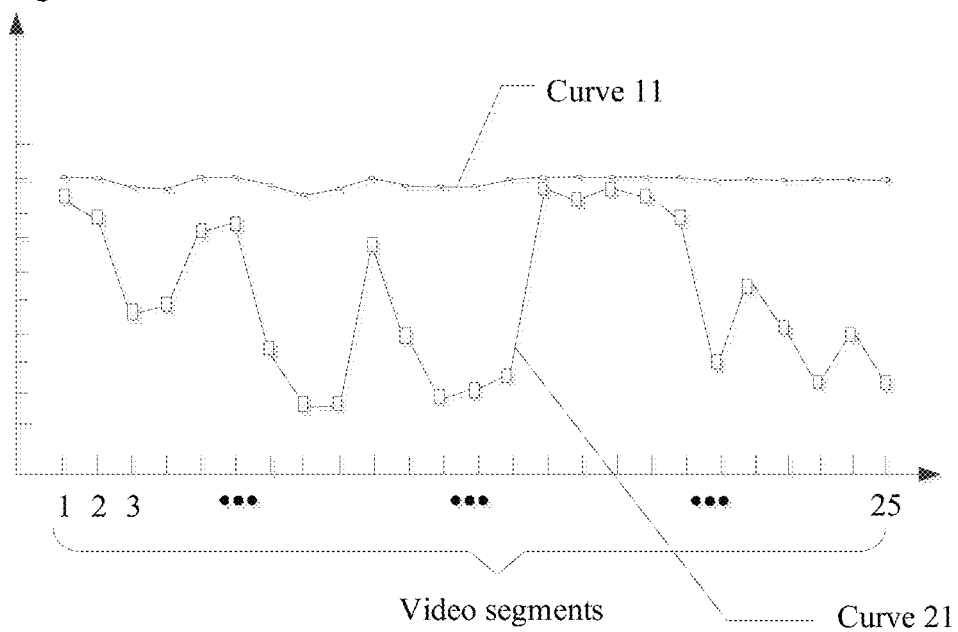
FIG. 5 is a schematic diagram of a scene of encoding bit rates for encoding different video segments according to embodiment(s) of the present disclosure.

Further, FIG. 5 is a schematic diagram of a scene of encoding bit rates for encoding different video segments according to an embodiment of the present disclosure. The video source in this embodiment of the present disclosure may include a plurality of video segments shown in FIG. 5, and the plurality of video segments may include a video segment 1, a video segment 2, a video segment 3, . . . , and a video segment 25 shown in FIG. 5. A curve 11 shown in FIG. 5 may be used for representing a schematic diagram of performing indiscriminate video encoding on the 25 video segments at a fixed encoding bit rate (for example, 4 M). In addition, a curve 21 may be used for representing a schematic diagram of encoding bit rates that are predicted by using the target prediction model and used for respectively encoding the different video segments when or in response to determining that the video quality standard parameter of the 25 video segments is configured as VMAF 90. In this embodiment of the present disclosure, the encoding bit rates of different video segments based on the same video quality index may be predicted by using a trained target prediction model. These video segments may be multi-transcoded in the same service server (for example, one first server) or in different service servers (for example, a plurality of first servers), and a quantity of the first servers for multi-transcoding is not limited herein.

In the video-on-demand scene, the second server may divide the video source into a plurality of video segments according to the first slice segmentation rule. That is, the second server may divide the video source into the plurality of video segments shown in FIG. 5 according to a video content feature (for example, scene information, image information, encoding information, or the like) of the video source during slicing of the video source corresponding to the 25 video segments shown in FIG. 5. The scene information may include scene category information, near/long view information, camera operation information, salient area information and the like included in the video source. The image information may include texture detail features, noise type features, color features, color contrast features and the like of the video source. The encoding information may include the key encoding information of the pre-encoded video sequence (for example, resolution information, information of the quantity of reference frames, or the like), the spatial complexity, the temporal complexity information, and the like. After the video content of the video source in the video-on-demand scene is analyzed once by using the first slice segmentation rule, video segments having different video content may be obtained.

For the ease of understanding, in this embodiment of the present disclosure, an implementation in which one video segment after slicing (that is, the first video sequence) is distributed to one first server is used as an example. During configuring of the video quality parameter for the 25 video segments shown in FIG. 5, the second server may configure the same video quality standard parameter in the same quality type and distribute the 25 video segments to 25 first servers in the same distributed network as the second server, to implement distributed transcoding in these first servers, thereby improving the efficiency of multi-transcoding in different first servers. When or in response to determining that one video segment corresponds to one transcoding server (that is, one first server), the encoding bit rates of all the video segments shown in FIG. 5 may be obtained by the first servers in the distributed server cluster after prediction by using the target prediction model. Therefore, for the video segments having different video content, since video content features of these video segments are generally different, the encoding bit rates predicted by the target prediction model in the first servers may be different, and a fitting curve between the plurality of video segments and the corresponding encoding bit rates shown in FIG. 5 may be referred to for details.

Figure 6:
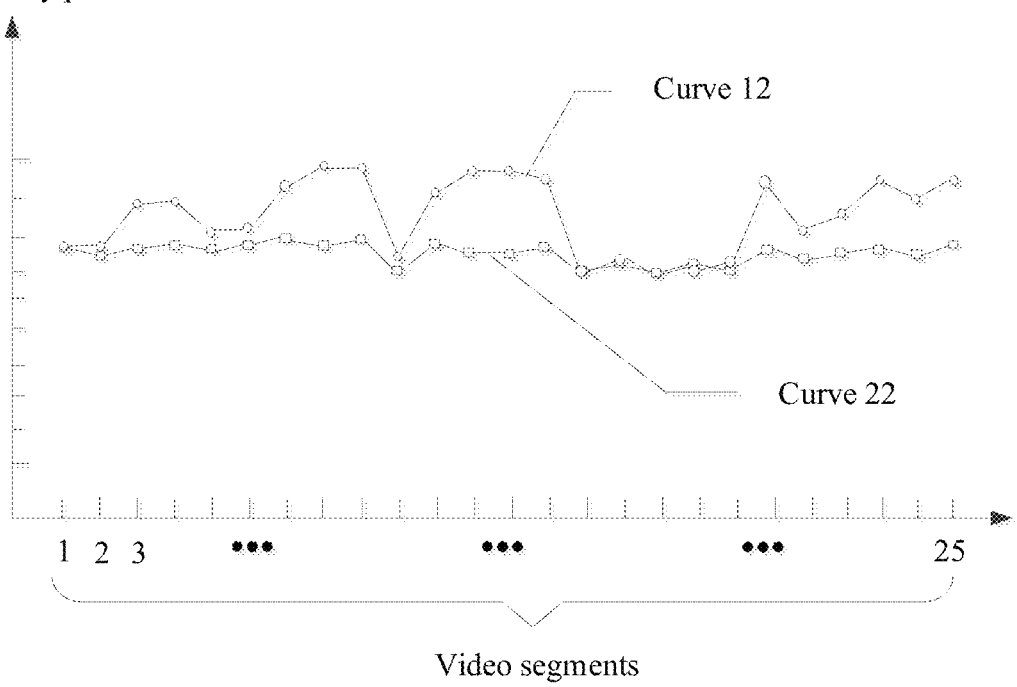
FIG. 6 is a schematic diagram of a scene of video quality obtained by encoding different video segments according to embodiment(s) of the present disclosure.

Further, FIG. 6 is a schematic diagram of a scene of video quality obtained by encoding different video segments according to an embodiment of the present disclosure. The video segments shown in FIG. 6 may be encoded sequences of the 25 video segments in the embodiment corresponding to FIG. 5. A curve 22 shown in FIG. 6 illustrates the video quality of the encoded sequences obtained by encoding the 25 video segments by using the different predicted encoding bit rates. That is to say, by encoding the 25 video segments by using the different encoding bit rates, it may be ensured that a fluctuation range of the video quality of the 25 video segments is relatively stable. By comparing the curve 12 and the curve 22 shown in FIG. 6, it can be learned that compared with the video quality (that is, the video quality represented by the curve 12) obtained by encoding these 25 video segments indiscriminately by using the fixed encoding bit rate, the video quality (that is, the video quality represented by the curve 22) obtained by encoding the corresponding video segments by using the predicted different encoding bit rates can be effectively ensured to be stable, thereby improving the playback effect of these video segments subsequently outputted to the on-demand terminal, that is, there is no drastic fluctuation in the video quality.

After the first servers in each of which the data processing apparatus is operated obtain the plurality of encoded bit streams associated with the video segment 300a (that is, the first video sequence), these encoded bit streams may be uniformly referred to as encoded video sequences, which may further be returned to the second server as encoded bit streams associated with the scaling parameter information, so that the second server combines, after receiving the encoded bit streams returned by all the first servers in the distributed server cluster for the same scaling parameter information, all the received encoded bit streams according to slice identification information associated with the sliced video source. For example, after the second server obtains the multi-transcoded bit streams returned by the plurality of first servers in the embodiment corresponding to FIG. 2, the encoded bit stream 100b returned by the server 10b, the encoded bit stream 200b returned by the server 10c, and the encoded bit stream 300b returned by the server 10d may be combined according to a target resolution (for example, the resolution 2) of the plurality of resolutions shown in FIG. 4, to obtain a combined bit stream associated with the resolution 2, so that the combined bit stream can be delivered to the on-demand terminal for playback when or in response to determining that the on-demand terminal requests to play the combined bit stream corresponding to the resolution 2.

In the video-on-demand scene, a service database corresponding to the service server may store video files that have been multi-transcoded (each video file is an encoded bit stream associated with the video source), the on-demand terminal may access the second server through a target client or a browser web page to obtain an encoded bit stream that matches the video data requested by the on-demand terminal from the service database associated with the second server. In this way, after obtaining the encoded bit stream, the on-demand terminal may decode the encoded bit stream by using a decoder supported by the on-demand terminal, so that the decoded video data may be played in the on-demand terminal. In this embodiment of the present disclosure, by setting the video quality standard parameter, the quality of the video data outputted by the on-demand terminal can be ensured, thereby improving the playback effect of the video data.

In the embodiments of the present disclosure, after obtaining of a to-be-encoded video sequence associated with a video source, a video quality standard parameter associated with the to-be-encoded video sequence may be obtained. In the embodiments of the present disclosure, a video sequence of each video segment of the video source based on corresponding scaling parameter information may be uniformly referred to as a to-be-encoded video sequence. Further, the to-be-encoded video sequence is pre-encoded according to the video quality standard parameter to obtain a pre-encoded video sequence and a video feature corresponding to the to-be-encoded video sequence is determined according to the pre-encoded video sequence. Further, an encoding bit rate associated with the to-be-encoded video sequence is predicted according to the video quality standard parameter and the video feature. Further, the to-be-encoded video sequence is encoded according to the encoding bit rate to obtain an encoded video sequence associated with the video source.

Hence, a video feature related to each video segment (that is, the to-be-encoded video sequence) can be quickly extracted by analyzing video content in each video segment of the video source once, so that given a set target quality, an encoding bit rate for encoding each video segment can be predicted by a prediction model, and further, given a set quality index (that is, a set video quality standard parameter), encoding bit rates of different video segments can be obtained through prediction, which can improve the accuracy of video encoding and reduce the waste in encoding resources while ensuring a specific video quality.

Figure 7:
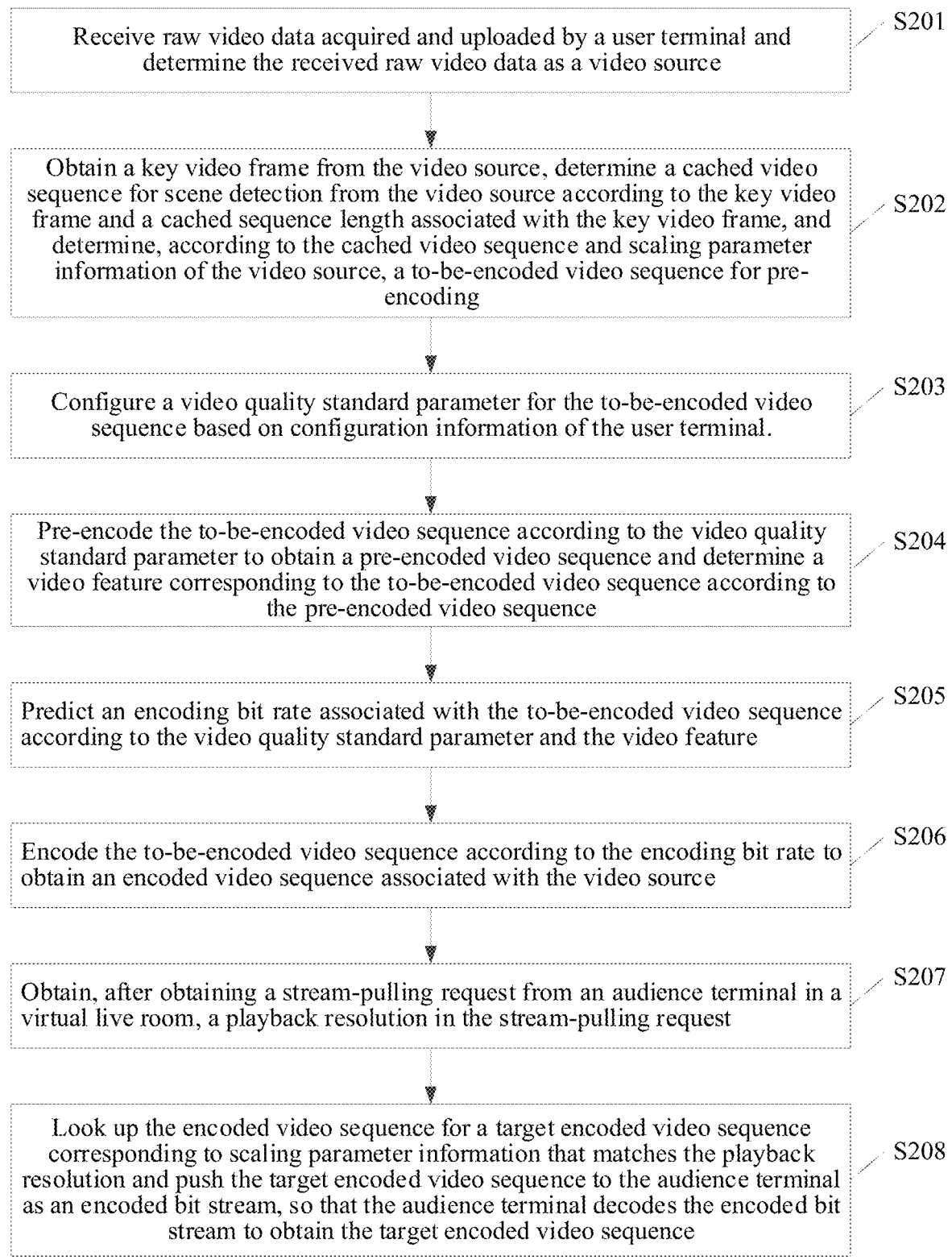
FIG. 7 is a schematic diagram of a video data processing method according to embodiment(s) of the present disclosure.

Further, FIG. 7 is a schematic diagram of a video data processing method according to an embodiment of the present disclosure. As shown in FIG. 7, the method may be performed by a video data processing apparatus having a video data processing function and the method may include the following step S201 to step S208.

Step S201: Receive raw video data acquired and uploaded by a user terminal and determine the received raw video data as a video source.

Further, the video data processing apparatus may determine, after obtaining the raw video data, whether the raw video data is live video data. If it is determined that the raw video data is live video data, the obtained raw video data may be used as the video source, and the obtained video source (that is, the live video data) may be directly multi-transcoded in a service server (for example, the second server in which the video data processing apparatus is operated), to output an encoded bit stream from the service server.

Step S202: Obtain a key video frame from the video source, determine a cached video sequence for scene detection from the video source according to the key video frame and a cached sequence length associated with the key video frame, and determine, according to the cached video sequence and scaling parameter information of the video source, a to-be-encoded video sequence for pre-encoding.

Further, the video source includes M video frames associated with an acquisition cycle, M being a positive integer. The video data processing apparatus may determine a 1st video frame as a first key video frame among the M video frames of the video source. Further, the video data processing apparatus may determine the cached video sequence for scene detection from the M video frames based on the first key video frame and a cached sequence length associated with the first key video frame. Further, the video data processing apparatus may determine a video frame other than the first key video frame as a to-be-detected video frame bi in the cached video sequence and perform scene shear detection on the to-be-detected video frame bi in the cached video sequence according to the first key video frame, i being a positive integer greater than 1 and less than M. Further, the video data processing apparatus may determine, upon detection of that a video content change degree between the first key video frame and the to-be-detected video frame bi is greater than a scene shear threshold, the to-be-detected video frame bi as a second key video frame. Further, the video data processing apparatus may use a video sequence between the first key video frame and the second key video frame as a raw video sequence, scale the raw video sequence according to the scaling parameter information of the video source, and determine a scaled raw video sequence as the to-be-encoded video sequence for pre-encoding.

Figure 8:
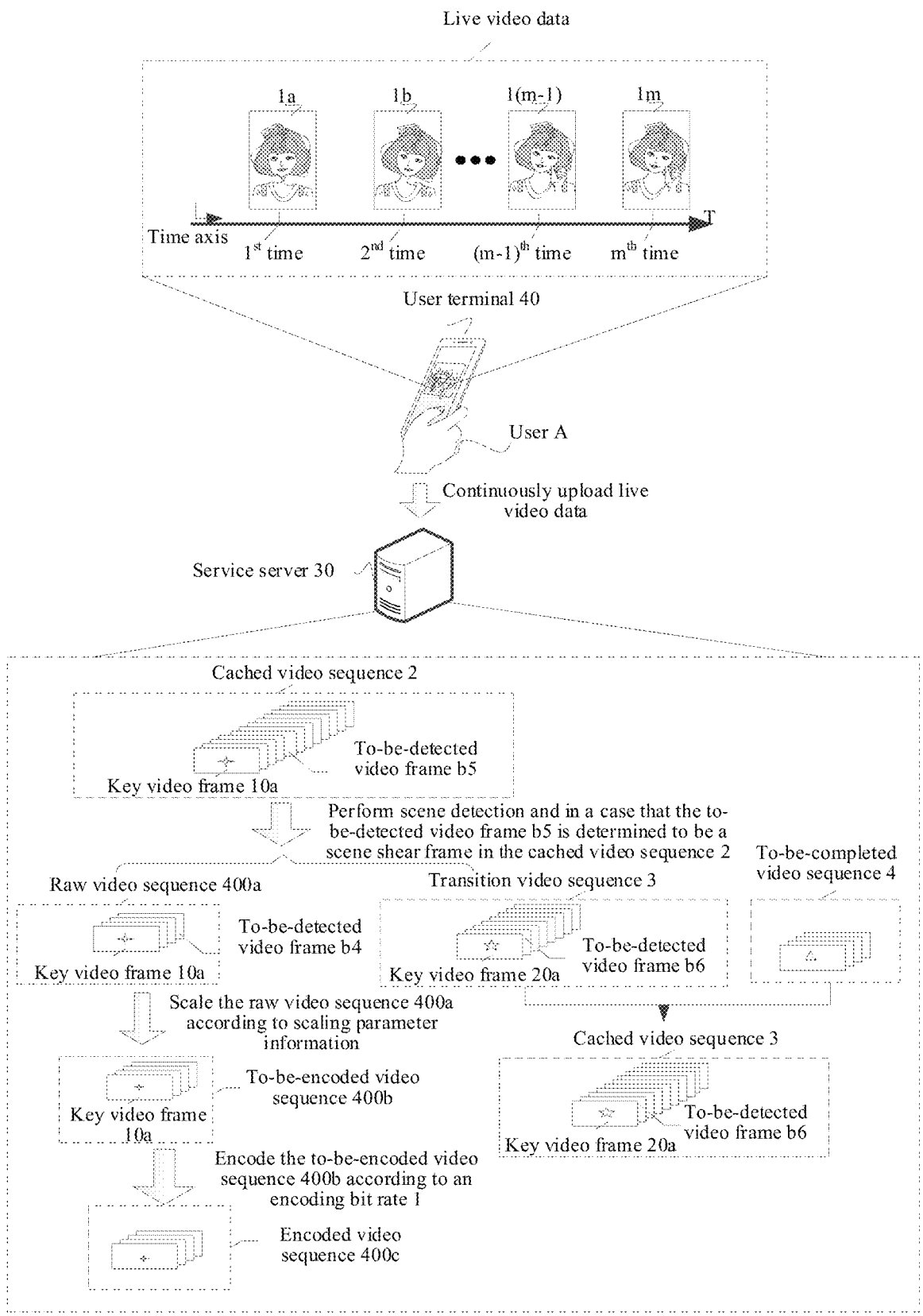
FIG. 8 is a schematic diagram of a scene of obtaining a video sequence in a video live scene according to embodiment(s) of the present disclosure.

Further, FIG. 8 is a schematic diagram of a scene of obtaining a to-be-encoded video sequence in a video live scene according to an embodiment of the present disclosure. In the video live scene, a user terminal 40 shown in FIG. 8 may be an anchor terminal corresponding to an anchor user (that is, a user A shown in FIG. 8), and raw video data obtained by the anchor terminal within an acquisition cycle may be live video data shown in FIG. 8. The live video data shown in FIG. 8 may include M video frames (that is, may include a video frame 1a, a video frame 1b, . . . , and a video frame 1m), where M may be 60. In this embodiment of the present disclosure, acquisition duration from a 1st time to an mth time shown in FIG. 8 may be uniformly referred to as an acquisition cycle. When or in response to determining that there is a network connection relationship between the user terminal 40 and a service server 30 shown in FIG. 8, the live video data obtained by the anchor terminal within the acquisition cycle may be uploaded to the service server 30 as a video source. The service server 30 may perform scene detection on the obtained cached video sequence associated with the video source according to a second slice segmentation rule in the video live scene.

The service server 30 shown in FIG. 8 may be the second server. After the second server determines that the live video data is obtained, the obtained live video data may be uniformly referred to as the video source, and each video frame in the video source is successively transmitted to a buffer. The length of the cached video sequence in the buffer may be 50 frames. As shown in FIG. 8, after obtaining a 1st video frame of the video source, the buffer in the service server 30 may determine the 1st video frame of the video source as a first key video frame, which may be a key video frame 10a in the cached video sequence 2 shown in FIG. 8. The key video frame 10a may be the video frame 1a shown in FIG. 8. After determining the key video frame 10a, the service server 30 may cache video frames of a specific sequence length starting from the key video frame 10a to form a cached video sequence 2 shown in FIG. 8. In this embodiment of the present disclosure, the specific sequence length in the buffer (for example, a frame length composed of L (for example, 50) video frames) may be uniformly referred to as a cached sequence length. L may be a positive integer less than or equal to M.

Further, after determining the cached video sequence 2 for scene detection from the video source, the service server 30 may use each remaining video frame other than the first key video frame (that is, the key video frame 10a) as a to-be-detected video frame in the cached video sequence 2, and a to-be-detected video frame whose video content is currently compared with that of the first key video frame may be recorded as a to-be-detected video frame bi. i may be a positive integer greater than 1 and less than M. For example, the video frames in the cached video sequence 2 may include the key video frame 10a, a to-be-detected video frame b2, a to-be-detected video frame b3, . . . , and a to-be-detected video frame bL. The service server may determine whether the current to-be-detected video frame bi is a scene shear frame by determining whether the video content change degree between the first key video frame and the to-be-detected video frame bi is greater than the scene shear threshold.

When or in response to determining that the service server 30 determines that the video content change degree between the key video frame 10a and the to-be-detected video frame b5 (in this implementation, i=5) shown in FIG. 8 is greater than the scene shear threshold, the to-be-detected video frame b5 may be determined as the second key video frame, and the second key video frame herein is the scene shear frame for representing the shear from one scene to another. When or in response to determining that the service server detects presence of a plurality of scenes in the cached video sequence 2, a video sequence between the first key video frame and the second key video frame may be referred to as the raw video sequence 400a in FIG. 8, and the raw video sequence 400a may include a video sequence formed from the key video frame 10a to the to-be-detected video frame b4. Further, the service server may scale the raw video sequence 400a according to the scaling parameter information (that is, the 1080p, 720p, or the like) of the video source, and a scaled raw video sequence 400a may be determined as a to-be-encoded video sequence 400b for pre-encoding, so that an encoding bit rate 1 associated with the to-be-encoded video sequence 400b may be obtained according to the following step S203 to step S206, and further the to-be-encoded video sequence 400b is encoded according to the encoding bit rate 1, to obtain an encoded video sequence 400c shown in FIG. 8.

After the buffer transmits the raw video sequence 400a to the initial encoder for pre-encoding, the raw video sequence 400a may be deleted from the buffer, and a cached video sequence after the raw video sequence 400a is deleted may be referred to as a transition video sequence 3 shown in FIG. 8. A 1st video frame of the transition video sequence 3 may be the second key video frame (that is, the key video frame 20a shown in FIG. 8 may be the to-be-detected video frame b5). In other words, video frames in the transition video sequence 3 may be a to-be-detected video frame left after the raw video sequence 400a is removed from the cached video sequence 2 (that is, the to-be-detected video frame b5, . . . , and the to-be-detected video frame bL). Because in the video live scene, the service server may obtain the live video data acquired and uploaded by the anchor terminal with the acquisition cycle, to facilitate further scene detection of the cached video sequence of the specific video length cached in the buffer, in this embodiment of the present disclosure, a to-be-performed video sequence 4 having the same quantity of frames as that of the raw video sequence 400a shown in FIG. 8 may further be determined from the video source according to the transition video sequence 3 and the cached sequence length. In this way, after the to-be-performed video sequence 4 is transmitted to the buffer, the transition video sequence 3 may be performed by using the to-be-performed video sequence 4, to further ensure that the cached video sequence 3 cached in the buffer can have the same cached sequence length as the cached video sequence 2. The cached video sequence 3 may be the transition video sequence after the completion. In this embodiment of the present disclosure, when or in response to determining that the key video frame 20*a* is used as the second key video frame, video frames other than the second key video frame may be determined as new to-be-detected video frames (that is, to-be-detected video frames dj) in the cached video sequence 3, so that scene detection can be performed on these new to-be-detected video frames in the cached video sequence 3 according to the second key video frame. j may be a positive integer greater than 1 and less than or equal to L.

In certain embodiment(s), the term "to-be-performed video sequence" is interchangeable with the term "video sequence."

The specific implementation for the service server 30 to perform scene detection on the to-be-detected video frame dj in the cached video sequence (that is, the cached video sequence 3 shown in FIG. 8) dynamically updated in the buffer may be referred to the description of the scene detection on the to-be-detected video frame bi in the cached video sequence 2, which is not be described herein again.

In certain embodiment(s), the term "to-be-detected video frame" is interchangeable with the term "video frame."

Step S203: Configure a video quality standard parameter for the to-be-encoded video sequence based on configuration information of the user terminal.

Step S204: Pre-encode the to-be-encoded video sequence according to the video quality standard parameter to obtain a pre-encoded video sequence and determine a video feature corresponding to the to-be-encoded video sequence according to the pre-encoded video sequence.

Step S205: Predict an encoding bit rate associated with the to-be-encoded video sequence according to the video quality standard parameter and the video feature.

Step S206: Encode the to-be-encoded video sequence according to the encoding bit rate to obtain an encoded video sequence associated with the video source.

In certain embodiment(s), the term "pre-encode" or "pre-encoding" refers to a process step of encoding the video sequence such as step S204 that occurs prior to a process step of encoding the video sequence according to the encoding bit rate such as such S206.

Step S207: Obtain, after obtaining a stream-pulling request from an audience terminal in a virtual live room, a playback resolution in the stream-pulling request.

Step S208: Look up the encoded video sequence for a target encoded video sequence corresponding to scaling parameter information that matches the playback resolution and push the target encoded video sequence to the audience terminal as an encoded bit stream, so that the audience terminal decodes the encoded bit stream to obtain the target encoded video sequence.

The implementation scenes of step S201 to step S208 described in this embodiment of the present disclosure may include the video live scene and may further include the video-on-demand scene. Stream pulling in step S207 refers to a process in which a client pulls live content that exists in a server by using a designated address, and therefore the stream-pulling request from the audience terminal is a request from the audience terminal for pulling live video content.

Figure 9:
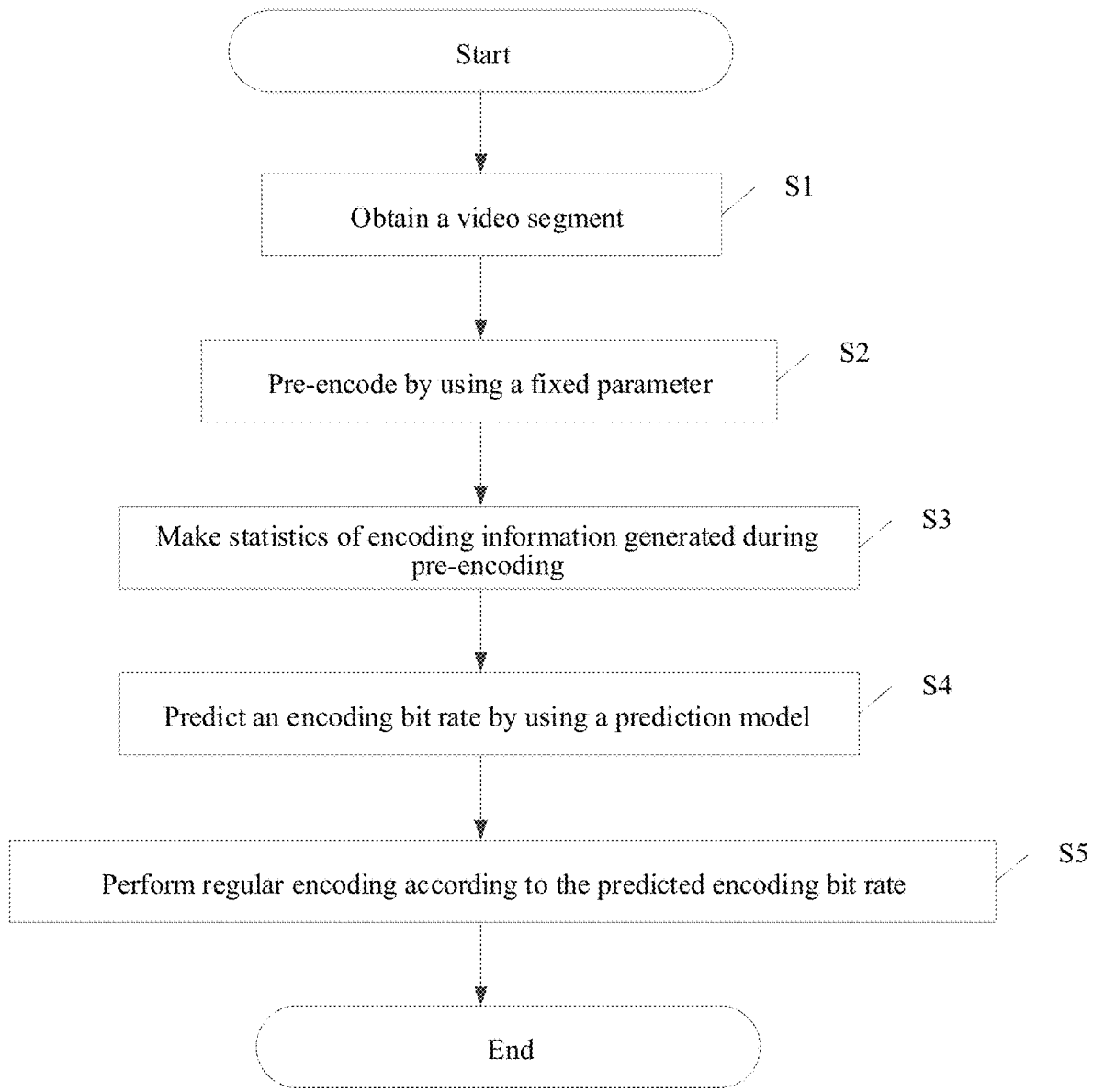
FIG. 9 is a schematic diagram of an overall flow of obtaining an encoded bit stream according to embodiment(s) of the present disclosure.

Further, FIG. 9 is a schematic diagram of an overall flow of obtaining an encoded bit stream according to an embodiment of the present disclosure. Step S1 to step S5 shown in FIG. 9 may be applied to any service server in the distributed transcoding system. Step S1 indicates that after obtaining a video segment, the service server may scale the video segment to different resolutions by using a fixed encoding parameter (for example, by setting the target quality type and the video quality standard parameter in the target quality type), then perform pre-encoding in step S2 on encoded video sequences obtained after scaling, and further use encoding information generated during the pre-encoding of the to-be-encoded video sequences and obtained through statistics as video features of the to-be-encoded video sequences. As shown in step S4 shown in FIG. 9, the service server may predict encoding bit rates for encoding the to-be-encoded video sequences by using a prediction model that matches the target quality type, so that step S5 is further performed according to the predicted encoding bit rates, to obtain a plurality of encoding bit rates associated with the video segment shown in FIG. 9.

The process of training a prediction model corresponding to a plurality of quality types may roughly include selection of sample video sequences, extraction of sample video features, extraction of quality tag information, and the training of the prediction model. Further, the first server in the distributed transcoding system may use, after obtaining N sample video sequences associated with a plurality of service scenes, sample video features of the N sample video sequences as N reference video features, and may obtain a plurality of quality types associated with the N sample video sequences, N being a positive integer, and one sample video feature being determined after pre-encoding one sample video sequence. Further, the first server may obtain a target quality type from the plurality of quality types and obtain a sample bit rate parameter associated with the target quality type. The sample bit rate parameter includes K pieces of sample bit rate information, K being a positive integer. Further, the first server may perform traversal encoding on each of the N sample video sequences according to the K pieces of sample bit rate information to obtain quality evaluation values of each sample video sequence based on the K pieces of sample bit rate information. One quality evaluation value is determined for one sample video sequence based on one piece of sample bit rate information. Further, the first server may use all the obtained quality evaluation values as quality tag information of an initial model associated with the target quality type, to train the initial model according to the quality tag information and the N reference video features and determine, according to a training result, the prediction model that matches the target quality type.

In the process of selecting a sample video sequence, it may be necessary to ensure that the selected samples can cover all service scenes in the actual service types as much as possible, so as to ensure the universality of the prediction model obtained after subsequent training. The actual service types may include news, animation, variety shows, games, movies and TVs, and the like, and the service scenes may include scene information such as some complex pictures, simple pictures, violent motion shots and still shots. The size of the sample video sequence may generally be about 10,000 video segments.

The feature extraction process of sample video features may be referred to the specific process of extracting the video features of the video segments in the embodiment corresponding to FIG. 9, which is not described herein again.

In the process of extracting the quality tag information of the sample video sequence, one prediction model may be trained for each quality type. Because this embodiment of the present disclosure aims to predict a bit rate parameter of a video segment based on a target index (that is, the video quality standard parameter) of a target quality type by using the prediction model obtained after final training, in the process of extracting the quality tag information in this embodiment of the present disclosure, it may be necessary to obtain quality evaluation values of the sample video sequence based on a specific bit rate parameter (for example, at all bit rates of [0-51]) through traversal encoding of the sample video sequence, and further the quality evaluation values (referring to quality evaluation scores herein) of the same sample video sequence based on all encoding parameters of different quality types may be established. For example, when or in response to determining that the sample rate parameter is a first-type encoding parameter (for example, a crf encoding parameter), a quantization step (that is, an interval) may be set to 1, so that a corresponding table of bit rate values of a sample video sequence in a specific quality type may be obtained, that is, one bit rate value may correspond to one quality evaluation value, and these obtained quality evaluation values all may be used as quality tag information of this sample video sequence based on the corresponding sample bit rate parameter. In this embodiment of the present disclosure, when or in response to determining that the sample bit rate parameter is a second-type encoding parameter (for example, a bitrate encoding parameter), a quantization step of 10 kbps may be set in a bit rate range of 10 kbps to 5 Mbps, to generate a piece of quality tag information.

An initial model used in a process of training an initial model associated with the target quality type by using the sample video features is a multi-layer neural network model. After the extracted sample video features are inputted to the multi-layer neural network model, a bit rate value corresponding table of each sample video feature based on a specified quality index may be outputted.

There are some differences in the slice segmentation rules used in the two implementation scenes. For example, after obtaining on-demand video data, the service server may directly use the first slice segmentation rule to slice the obtained video source into a plurality of video segments. However, after obtaining live video data, the service server cannot directly use the first slice segmentation rule to slice the video source into a plurality of video segments, and therefore may need to use the second slice segmentation rule to first obtain a cached video sequence having a specific sequence length from the video source and then perform scene detection on the cached video sequence, so as to determine, from the cached video sequence according to a scene detection result, to-be-encoded video sequences for pre-encoding.

In this embodiment of the present disclosure, a video feature related to each video segment (that is, the to-be-encoded video sequence) can be quickly extracted by analyzing video content in each video segment of the video source once, so that given a set target quality, an encoding bit rate for encoding each video segment can be predicted by a prediction model, and further, given a set quality index (that is, a set video quality standard parameter), encoding bit rates of different video segments can be obtained through prediction, which can improve the accuracy of video encoding and reduce the waste in encoding resources while ensuring a specific video quality.

Figure 10:
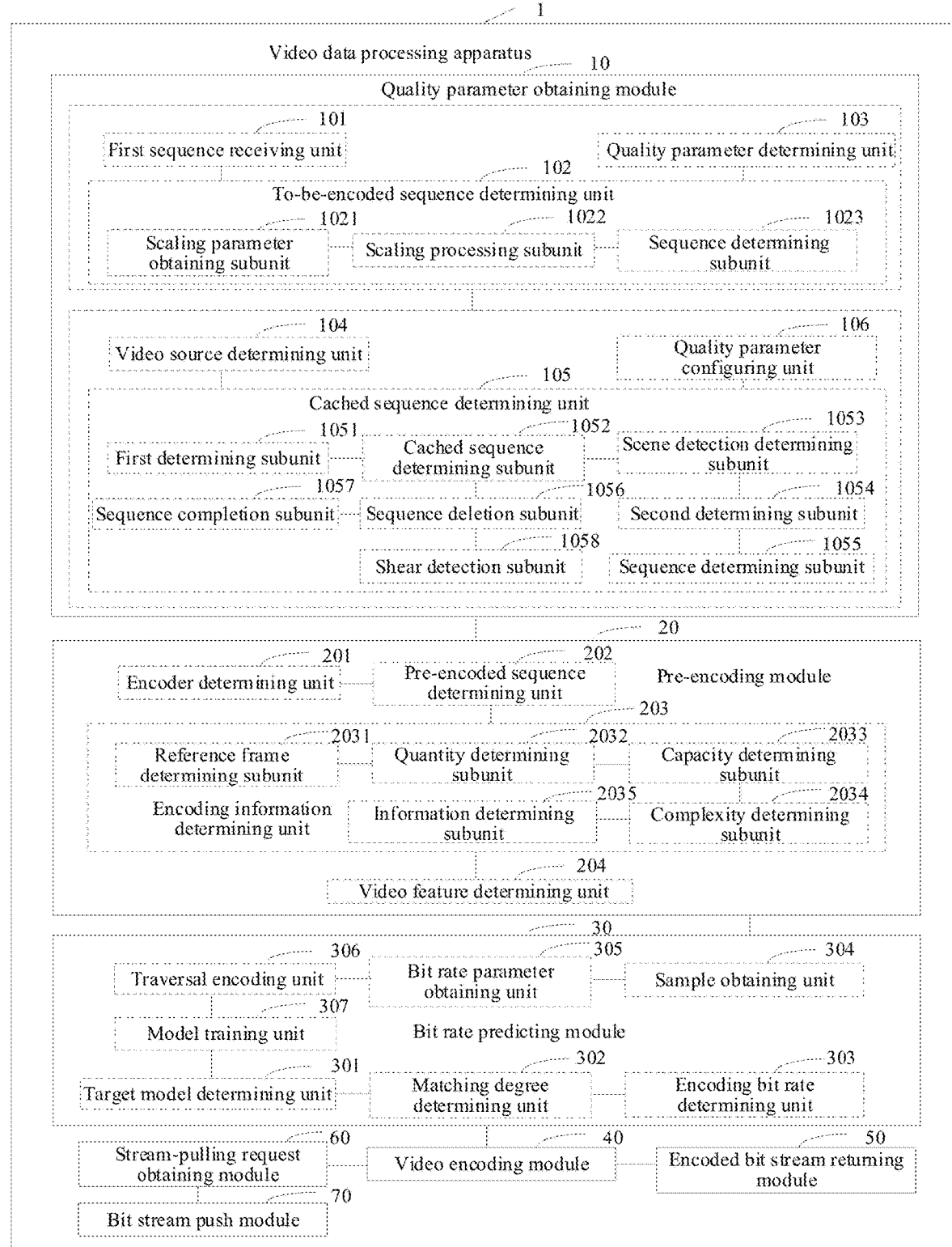
FIG. 10 is a schematic structural diagram of a video data processing apparatus according to embodiment(s) of the present disclosure.

Further, FIG. 10 is a schematic structural diagram of a video data processing apparatus 1 according to an embodiment of the present disclosure. The video data processing apparatus 1 may be operated in the server 10a (that is, the second server) in the embodiment corresponding to FIG. 2, so that the server 10a multi-transcodes an obtained to-be-encoded video sequence in a video live scene. In this embodiment of the present disclosure, the video data processing apparatus 1 may alternatively be operated in the server 10b (that is, the first server) in the embodiment corresponding to FIG. 2, so that the server 10b multi-transcodes an obtained to-be-encoded video sequence in a video-on-demand scene. Further, the video data processing apparatus 1 may include a quality parameter obtaining module 10, a pre-encoding module 20, a bit rate predicting module 30, and a video encoding module 40. Further, the video data processing apparatus 1 may further include an encoded bit stream returning module 50, a stream-pulling request obtaining module 60, and a bit stream push module 70.

The quality parameter obtaining module 10 is configured to obtain a to-be-encoded video sequence associated with a video source and obtain a video quality standard parameter associated with the to-be-encoded video sequence.

The quality parameter obtaining module 10 includes: a first sequence receiving unit 101, a to-be-encoded sequence determining unit 102, and a quality parameter determining unit 103. The video data processing apparatus 1 may further include a video source determining unit 104, a cached sequence determining unit 105, and a quality parameter configuring unit 106.

The first sequence receiving unit 101 is configured to receive a first video sequence of the video source and distributed by a service server. The first video sequence is determined by the service server after slicing the video source.

The to-be-encoded sequence determining unit 102 is configured to determine the to-be-encoded video sequence associated with the video source according to scaling parameter information of the video source and the first video sequence.

The to-be-encoded sequence determining unit 102 includes: a scaling parameter obtaining subunit 1021, a scaling processing subunit 1022, and a sequence determining subunit 1023.

The scaling parameter obtaining subunit 1021 is configured to obtain scaling parameter information associated with a resolution of the video source.

The scaling processing subunit 1022 is configured to scale a resolution of the first video sequence according to the scaling parameter information and determine a scaled first video sequence as a second video sequence, the resolution of the first video sequence being determined by the resolution of the video source.

The sequence determining subunit 1023 is configured to determine a to-be-encoded video sequence according to the second video sequence and the resolution of the second video sequence.

The specific implementations of the scaling parameter obtaining subunit 1021, the scaling processing subunit 1022 and the sequence determining subunit 1023 may be referred to the specific process of obtaining the to-be-encoded video sequence in the video-on-demand scene in the embodiment corresponding to FIG. 3, which are not described herein again.

The quality parameter determining unit 103 is configured to use a video quality parameter configured by the service server for the first video sequence as the video quality standard parameter associated with the to-be-encoded video sequence.

The video source determining unit 104 is configured to receive raw video data acquired and uploaded by the user terminal and determine the received raw video data as the video source.

The cached sequence determining unit 105 is configured to obtain a key video frame from the video source, determine a cached video sequence for scene detection from the video source according to the key video frame and a cached sequence length associated with the key video frame, and determine, according to the cached video sequence and scaling parameter information of the video source, a to-be-encoded video sequence for pre-encoding.

The video source includes M video frames associated with an acquisition cycle, M being a positive integer.

The cached sequence determining unit 105 includes a first determining subunit 1051, a cached sequence determining subunit 1052, a scene detection determining subunit 1053, a second determining subunit 1054, and a sequence determining subunit 1055. The cached sequence determining unit 105 may further include a sequence deletion subunit 1056, a sequence completion subunit 1057, and a shear detection subunit 1058.

The first determining subunit 1051 is configured to determine a 1st video frame as a first key video frame among the M video frames of the video source.

The cached sequence determining subunit 1052 is configured to determine a cached video sequence for scene detection from the M video frames according to the first key video frame and a cached sequence length associated with the first key video frame.

The scene detection determining subunit 1053 is configured to determine a video frame other than the first key video frame as a to-be-detected video frame bi in the cached video sequence and perform scene shear detection on the to-be-detected video frame bi in the cached video sequence according to the first key video frame, i being a positive integer greater than 1 and less than M.

The second determining subunit 1054 is configured to determine, upon detection of that a video content change degree between the first key video frame and the to-be-detected video frame bi is greater than a scene shear threshold, the to-be-detected video frame bi as a second key video frame.

The sequence determining subunit 1055 is configured to use a video sequence between the first key video frame and the second key video frame as a raw video sequence, scale the raw video sequence according to the scaling parameter information of the video source, and determine a scaled raw video sequence as the to-be-encoded video sequence for pre-encoding.

The sequence deletion subunit 1056 is configured to delete a raw video sequence from the cached video sequence to obtain a transition video sequence, a 1st video frame of the transition video sequence being the second key video frame.

The sequence completion subunit 1057 is configured to obtain a to-be-performed video sequence from the video source according to the transition video sequence and the cached sequence length and perform the transition video sequence according to the to-be-performed video sequence, a sequence length of the transition video sequence being the same as the cached sequence length.

The shear detection subunit 1058 is further configured to determine a video frame other than the second key video frame as a to-be-detected video frame dj in the transition video sequence and perform scene shear detection on the to-be-detected video frame dj in the transition video sequence according to the second key video frame, j being a positive integer greater than 1 and less than M.

The specific implementations of the first determining subunit 1051, the cached sequence determining subunit 1052, the scene detection determining subunit 1053, the second determining subunit 1054, the sequence determining subunit 1055, the sequence deletion subunit 1056, the sequence completion subunit 1057, and the shear detection subunit 1058 may be referred to the description about step S202 in the embodiment corresponding to FIG. 7, which are not described herein again.

The quality parameter configuring unit 106 is configured to configure a video quality standard parameter for the to-be-encoded video sequence based on configuration information of the user terminal.

In a video-on-demand scene, the video data processing apparatus 1 may determine a to-be-encoded video sequence associated with on-demand video data through the first sequence receiving unit 101, the to-be-encoded sequence determining unit 102, and the quality parameter determining unit 103. In a video live scene, the video data processing apparatus 1 may determine a to-be-encoded video sequence associated with live video data through the video source determining unit 104, the cached sequence determining unit 105, and the quality parameter configuring unit 106.

The pre-encoding module 20 is configured to pre-encode the to-be-encoded video sequence according to the video quality standard parameter to obtain a pre-encoded video sequence and determine a video feature corresponding to the to-be-encoded video sequence according to the pre-encoded video sequence.

The pre-encoding module 20 includes: an encoder determining unit 201, a pre-encoded sequence determining unit 202, an encoding information determining unit 203, and a video feature determining unit 204.

The encoder determining unit 201 is configured to obtain, according to the video quality standard parameter, an initial encoder configured to pre-encode the to-be-encoded video sequence.

The pre-encoded sequence determining unit 202 is configured to pre-encode the to-be-encoded video sequence according to the initial encoder to obtain the pre-encoded video sequence. The pre-encoded video sequence includes key video frames and predicted video frames.

The encoding information determining unit 203 is configured to determine encoding information of the pre-encoded video sequence according to the key video frames, the predicted video frames, a resolution of the pre-encoded video sequence, and a bit rate of the pre-encoded video sequence.

The predicted video frames include forward predicted frames.

The encoding information determining unit 203 includes a reference frame determining subunit 2031, a quantity determining subunit 2032, a capacity determining subunit 2033, a complexity determining subunit 2034, and an information determining subunit 2035.

The reference frame determining subunit 2031 is configured to obtain key video frames selected during inter-frame compression of the forward predicted frames and determine the selected key video frames as reference video frames corresponding to the forward predicted frames.

The quantity determining subunit 2032 is configured to determine a total quantity of the selected reference video frames as a first quantity, determine a total quantity of the key video frames as a second quantity, and determine a total quantity of the forward predicted frames as a third quantity.

The capacity determining subunit 2033 is configured to determine a first average data capacity of the key video frames according to data capacities corresponding to the key video frames and the second quantity and determine a second average data capacity of the forward predicted frames according to data capacities corresponding to the forward predicted frames and the third quantity.

The complexity determining subunit 2034 is configured to obtain a maximum data capacity from the data capacities corresponding to the key video frames, determine a ratio of the first average data capacity to the maximum data capacity as a spatial complexity of the pre-encoded video sequence, and determine a ratio of the second average data capacity to the first average data capacity as a temporal complexity of the pre-encoded video sequence.

The information determining subunit 2035 is configured to determine the first quantity, the second quantity, the third quantity, the spatial complexity, the temporal complexity, the resolution of the pre-encoded video sequence, and the bit rate of the pre-encoded video sequence as the encoding information of the pre-encoded video sequence.

The specific implementations of the reference frame determining subunit 2031, the quantity determining subunit 2032, the capacity determining subunit 2033, the complexity determining subunit 2034, and the information determining subunit 2035 may be referred to the description of the encoding information, which are not described herein again.

The video feature determining unit 204 is configured to determine the encoding information as the video feature corresponding to the to-be-encoded video sequence.

The specific implementations of the encoder determining unit 201, the pre-encoded sequence determining unit 202, the encoding information determining unit 203, and the video feature determining unit 204 may be referred to the description of obtaining the video feature of the to-be-encoded video sequence in the embodiment corresponding to FIG. 3, which are not described herein again.

The bit rate predicting module 30 is configured to predict an encoding bit rate associated with the to-be-encoded video sequence according to the video quality standard parameter and the video feature.

The bit rate predicting module 30 includes a target model determining unit 301, a matching degree determining unit 302, and an encoding bit rate determining unit 303. The bit rate predicting module 30 may further include a sample obtaining unit 304, a bit rate parameter obtaining unit 305, a traversal encoding unit 306, and a model training unit 307.

The target model determining unit 301 is configured to obtain a target quality type corresponding to the video quality standard parameter and use a prediction model that is in a prediction model library associated with a plurality of quality types and that matches the target quality type as a target prediction model.

The matching degree determining unit 302 is configured to input the video feature to the target prediction model which then outputs matching degrees between the video feature and a plurality of reference video features in the target prediction model.

The encoding bit rate determining unit 303 is configured to use a reference video feature having a highest matching degree with the video feature as a target reference video feature and use sample bit rate information corresponding to quality tag information associated with the target reference video feature as the encoding bit rate associated with the to-be-encoded video sequence.

The sample obtaining unit 304 is configured to obtain N sample video sequences associated with a plurality of service scenes, use sample video features of the N sample video sequences as N reference video features, and obtain a plurality of quality types associated with the N sample video sequences, N being a positive integer. one sample video feature being determined after pre-encoding one sample video sequence.

The bit rate parameter obtaining unit 305 is configured to obtain a target quality type from the plurality of quality types and obtain a sample bit rate parameter associated with the target quality type, the sample bit rate parameter including K pieces of sample bit rate information, and K being a positive integer.

The traversal encoding unit 306 is configured to perform traversal encoding on each of the N sample video sequences according to the K pieces of sample bit rate information to obtain quality evaluation values of each sample video sequence based on the K pieces of sample bit rate information. one quality evaluation value being determined after encoding one sample video sequence based on one piece of sample bit rate information; and The model training unit 307 is configured to use all the obtained quality evaluation values as quality tag information of an initial model associated with the target quality type, train the initial model according to the quality tag information and the N reference video features, and determine, according to a training result, a prediction model that matches the target quality type.

The specific implementations of the target model determining unit 301, the matching degree determining unit 302, and the encoding bit rate determining unit 303 may be referred to the description of the encoding bit rate in the embodiment corresponding to FIG. 3, which are not described herein again. The specific implementations of the sample obtaining unit 304, the bit rate parameter obtaining unit 305, the traversal encoding unit 306, and the model training unit 307 may be referred to the description of the initial training model in the embodiment corresponding to FIG. 9, which are not described herein again.

The video encoding module 40 is configured to encode the to-be-encoded video sequence according to the encoding bit rate to obtain an encoded video sequence associated with the video source.

The video data processing apparatus 1 may be operated in a first server in a distributed server cluster. The service server is a second server in the distributed server cluster.

The encoded bit stream returning module 50 is configured to return the encoded video sequence to the second server as an encoded bit stream associated with the scaling parameter information, so that the second server combines, after receiving encoded bit streams returned by all first servers in the distributed server cluster for the same scaling parameter information, all the received encoded bit streams according to slice identification information associated with the sliced video source.

The user terminal is an anchor terminal in a virtual live room and the raw video data is live video data acquired by the anchor terminal.

The stream-pulling request obtaining module 60 is configured to obtain, after obtaining a stream-pulling request from an audience terminal in the virtual live room, a playback resolution in the stream-pulling request.

The bit stream push module 70 is configured to look up the encoded video sequence for a target encoded video sequence corresponding to scaling parameter information that matches the playback resolution and push the target encoded video sequence to the audience terminal as an encoded bit stream, so that the audience terminal decodes the encoded bit stream to obtain the target encoded video sequence.

The specific implementations of the quality parameter obtaining module 10, the pre-encoding module 20, the bit rate predicting module 30, and the video encoding module 40 may be referred to the description of step S101 to step S104 in the embodiment corresponding to FIG. 3, which are not described herein again. Further, the specific implementations of the encoded bit stream returning module 50, the stream-pulling request obtaining module 60, and the bit stream push module 70 may be referred to the description of obtaining encoded video sequences in different service scenes in the embodiment corresponding to FIG. 7, which are not described herein again.

The video data processing apparatus 1 in this embodiment of the present disclosure may perform the video data processing method in the embodiment corresponding to FIG. 3 or FIG. 7, which is not be described herein again. In addition, the description of beneficial effects of using the same method are not described herein again.

Figure 11:
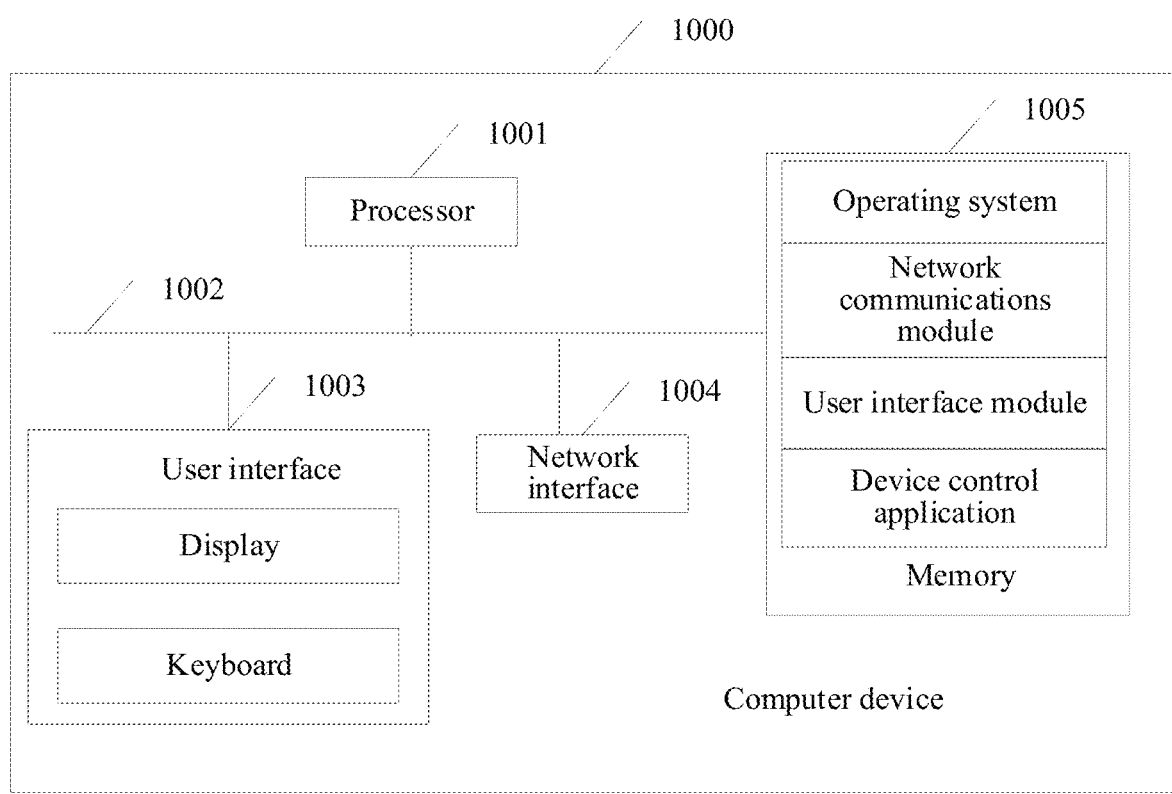
FIG. 11 is a schematic structural diagram of a computing device according to embodiment(s) of the present disclosure.

Further, FIG. 11 is a schematic structural diagram of a computing device 1000 according to an embodiment of the present disclosure. As shown in FIG. 11, the computing device 1000 may be the server 10*a* in the embodiment corresponding to FIG. 2, or may alternatively be the server 10*b* in the embodiment corresponding to FIG. 2, which is not limited herein. The computing device 1000 may include: a processor 1001, a network interface 1004, and a memory 1005, as well as a user interface 1003 and at least one communication bus 1002. The communication bus 1002 is configured to implement connection and communication between these components. The user interface 1003 may include a display and a keyboard. The user interface 1003 may further include a standard wired interface or wireless interface. The network interface 1004 may include a standard wired interface and wireless interface (for example, a Wi-Fi interface). The memory 1004 may be a high-speed RAM, or may be a non-transitory memory or a non-volatile memory, for example, at least one magnetic disk memory. The memory 1005 may alternatively be at least one storage apparatus located away from the processor 1001. As shown in FIG. 11, the memory 1005, as a computer storage medium, may include an operating system, a network communication module, a user interface module, and a device control application.

The user interface 1003 in the computing device 1000 may alternatively include a display and a keyboard. In the computing device 1000 shown in FIG. 11, the network interface 1004 may provide a network communication function. The user interface 1003 is configured to provide an input interface for a user. The processor 1001 may be configured to invoke the device control application stored in the memory 1005, to implement: obtaining a to-be-encoded video sequence associated with a video source and obtaining a video quality standard parameter associated with the to-be-encoded video sequence; pre-encoding the to-be-encoded video sequence according to the video quality standard parameter to obtain a pre-encoded video sequence and determining a video feature corresponding to the to-be-encoded video sequence according to the pre-encoded video sequence; predicting an encoding bit rate associated with the to-be-encoded video sequence according to the video quality standard parameter and the video feature; and encoding the to-be-encoded video sequence according to the encoding bit rate to obtain an encoded video sequence associated with the video source.

The computing device 1000 described in this embodiment of the present disclosure can implement the descriptions of the video data processing method in the embodiment corresponding to FIG. 3 or FIG. 7, and can also implement the functions of the video data processing apparatus 1 in the embodiment corresponding to FIG. 10. Details are not described herein again. In addition, the description of beneficial effects of using the same method are not described herein again.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

In addition, the embodiments of the present disclosure further provide a computer storage medium. The storage medium stores a computer program executed by the video data processing apparatus 1, and the computer program includes program instructions. When executing the program instructions, the processor can perform the descriptions of the video data processing method in the embodiment corresponding to 3 or FIG. 7. Details are not described herein again. In addition, the description of beneficial effects of using the same method are not described herein again. For technical details that are not disclosed in the computer storage medium embodiments of the present disclosure, refer to the descriptions of the method embodiments of the present disclosure.

A person of ordinary skill in the art may understand that all or some of the processes of the methods in the embodiments may be implemented by a computer program instructing relevant hardware. The program may be stored in a computer-readable storage medium. During the execution of the program, processes of the method embodiments may be included. The storage medium may be a magnetic disk, an optical disc, a read-only memory (ROM), a random access memory (RAM), or the like.

What are disclosed above are merely embodiments of the present disclosure, and are not intended to limit the protection scope of the present disclosure. Therefore, equivalent variations made in accordance with the claims of the present disclosure shall fall within the scope of the present disclosure.

What is claimed is:

1. A video data processing method, performed by a server, the method comprising:
obtaining a video sequence associated with a video source and obtaining a video quality standard parameter associated with the video sequence;
determining a video feature according to the video quality standard parameter, comprising:
pre-encoding the video sequence according to the video quality standard parameter to obtain a pre-encoded video sequence, the pre-encoded video sequence including key video frames and predicted video frames;
determining encoding information of the pre-encoded video sequence according to the key video frames, the predicted video frames, a resolution of the pre-encoded video sequence, and a bit rate of the pre-encoded video sequence; and determining the encoding information as the video feature corresponding to the video sequence;

determining an encoding bit rate according to the video quality standard parameter and the video feature; and encoding the video sequence according to the encoding bit rate to obtain an encoded video sequence associated with the video source.

2. The method according to claim 1, wherein obtaining the video sequence associated comprises:

receiving a first video sequence of the video source distributed by a service server, the first video sequence being determined after the service server slices the video source;

determining the video sequence associated with the video source according to scaling parameter information of the video source and the first video sequence; and using a video quality parameter configured by the service server for the first video sequence as the video quality standard parameter associated with the video sequence.

3. The method according to claim 2, wherein determining the video sequence associated with the video source comprises:

obtaining the scaling parameter information associated with a resolution of the video source;

scaling a resolution of the first video sequence according to the scaling parameter information and determining a scaled first video sequence as a second video sequence, the resolution of the first video sequence being determined by the resolution of the video source; and determining the video sequence according to the second video sequence and a resolution of the second video sequence.

4. The method according to claim 1, wherein the predicted video frames include forward predicted frames, and wherein determining encoding information of the pre-encoded video sequence comprises:

obtaining key video frames selected during inter-frame compression of the forward predicted frames and determining the selected key video frames as reference video frames corresponding to the forward predicted frames;

determining a total quantity of the selected reference video frames as a first quantity, determining a total quantity of the key video frames as a second quantity, and determining a total quantity of the forward predicted frames as a third quantity;

determining a first average data capacity of the key video frames according to data capacities corresponding to the key video frames and the second quantity and determining a second average data capacity of the forward predicted frames according to data capacities corresponding to the forward predicted frames and the third quantity;

obtaining a maximum data capacity from the data capacities corresponding to the key video frames, using a ratio of the first average data capacity to the maximum data capacity as a spatial complexity of the pre-encoded video sequence, and determining a ratio of the second average data capacity to the first average data capacity as a temporal complexity of the pre-encoded video sequence; and determining the first quantity, the second quantity, the third quantity, the spatial complexity, the temporal complexity, the resolution of the pre-encoded video sequence, and the bit rate of the pre-encoded video sequence as the encoding information of the pre-encoded video sequence.

5. The method according to claim 1, wherein determining the encoding bit rate comprises:

obtaining a target quality type corresponding to the video quality standard parameter and using a prediction model that is in a prediction model library associated with a plurality of quality types and that matches the target quality type as a target prediction model;

inputting the video feature to the target prediction model and outputting matching degrees between the video feature and a plurality of reference video features in the target prediction model; and using a reference video feature having a highest matching degree with the video feature as a target reference video feature and using sample bit rate information corresponding to quality tag information associated with the target reference video feature as the encoding bit rate associated with the video sequence.

6. The method according to claim 5, further comprising:

obtaining N sample video sequences associated with a plurality of service scenes, using sample video features of the N sample video sequences as N reference video features, and obtaining a plurality of quality types associated with the N sample video sequences, N being a positive integer one sample video feature being determined after pre-encoding one sample video sequence;

obtaining a target quality type from the plurality of quality types and obtaining a sample bit rate parameter associated with the target quality type, the sample bit rate parameter comprising K pieces of sample bit rate information, and K being a positive integer;

performing traversal encoding on each of the N sample video sequences according to the K pieces of sample bit rate information to obtain quality evaluation values of each sample video sequence based on the K pieces of sample bit rate information, one quality evaluation value being determined after encoding one sample video sequence based on one piece of sample bit rate information; and using all the obtained quality evaluation values as quality tag information of an initial model associated with the target quality type, training the initial model according to the quality tag information and the N reference video features, and determining, according to a training result, a prediction model that matches the target quality type.

7. The method according to claim 2, wherein the server is a first server in a distributed server cluster, and the service server is a second server in the distributed server cluster, and wherein the method further comprises:

returning the encoded video sequence to the second server as an encoded bit stream associated with the scaling parameter information, so that the second server combines, after receiving encoded bit streams returned by all first servers in the distributed server cluster for the same scaling parameter information, all the received encoded bit streams according to slice identification information associated with the sliced video source.

8. The method according to claim 1, wherein obtaining the video sequence comprises:

receiving raw video data acquired and uploaded by a user terminal and determining the received raw video data as the video source;

obtaining a key video frame from the video source, determining a cached video sequence for scene detection from the video source according to the key video frame and a cached sequence length associated with the key video frame, and determining, according to the cached video sequence and scaling parameter information of the video source, the video sequence for pre-encoding; and configuring a video quality standard parameter for the video sequence based on configuration information of the user terminal.

9. The method according to claim 8, wherein the video source includes M video frames associated with an acquisition cycle, M being a positive integer, and wherein obtaining the key video frame from the video source comprises:

determining a first video frame among the M video frames as a first key video frame of the video source;

determining a cached video sequence for scene detection from the M video frames according to the first key video frame and the cached sequence length associated with the first key video frame;

determining a video frame other than the first key video frame as a video frame bi in the cached video sequence and performing scene shear detection on the video frame bi in the cached video sequence according to the first key video frame, i being a positive integer greater than 1 and less than M;

determining, upon detection of that a video content change degree between the first key video frame and the video frame bi is greater than a scene shear threshold, the video frame bi as a second key video frame; and using a video sequence between the first key video frame and the second key video frame as a raw video sequence, scaling the raw video sequence according to the scaling parameter information of the video source, and determining a scaled raw video sequence as a video sequence for pre-encoding.

10. The method according to claim 9, further comprising:

deleting the raw video sequence from the cached video sequence to obtain a transition video sequence, a first video frame of the transition video sequence being the second key video frame;

obtaining a video sequence from the video source according to the transition video sequence and the cached sequence length and performing the transition video sequence according to the video sequence, a sequence length of the video sequence as performed being the same as the cached sequence length; and determining a video frame other than the second key video frame as a video frame $d_j$ in the transition video sequence and performing scene shear detection on the video frame $d_j$ in the transition video sequence according to the second key video frame, j being a positive integer greater than 1 and less than M.

11. The method according to claim 8, wherein the user terminal is an anchor terminal in a virtual live room and the raw video data is live video data acquired by the anchor terminal, and wherein the method further comprises:

obtaining, after obtaining a stream-pulling request from an audience terminal in the virtual live room, a playback resolution in the stream-pulling request; and looking up the encoded video sequence for a target encoded video sequence corresponding to scaling parameter information that matches the playback resolution and using the target encoded video sequence as an encoded bit stream to push to the audience terminal, so that the audience terminal decodes the encoded bit stream to obtain the target encoded video sequence.

12. A video data processing apparatus, comprising: a memory storing computer program instructions; and a processor coupled to the memory and configured to execute the computer program instructions and perform:

obtaining a video sequence associated with a video source and obtain a video quality standard parameter associated with the video sequence;

determining a video feature according to the video quality standard parameter comprising:

pre-encoding the video sequence according to the video quality standard parameter to obtain a pre-encoded video sequence, the pre-encoded video sequence including key video frames and predicted video frames;

determining encoding information of the pre-encoded video sequence according to the key video frames, the predicted video frames, a resolution of the pre-encoded video sequence, and a bit rate of the pre-encoded video sequence; and determining the encoding information as the video feature corresponding to the video sequence;

determining an encoding bit rate according to the video quality standard parameter and the video feature; and encoding the video sequence according to the encoding bit rate to obtain an encoded video sequence associated with the video source.

13. The video data processing apparatus according to claim 12, wherein obtaining the video sequence associated includes:

receiving a first video sequence of the video source distributed by a service server, the first video sequence being determined after the service server slices the video source;

determining the video sequence associated with the video source according to scaling parameter information of the video source and the first video sequence; and using a video quality parameter configured by the service server for the first video sequence as the video quality standard parameter associated with the video sequence.

14. The video data processing apparatus according to claim 13, wherein determining the video sequence associated with the video source includes:

obtaining the scaling parameter information associated with a resolution of the video source;

scaling a resolution of the first video sequence according to the scaling parameter information and determining a scaled first video sequence as a second video sequence, the resolution of the first video sequence being determined by the resolution of the video source; and determining the video sequence according to the second video sequence and a resolution of the second video sequence.

15. The video data processing apparatus according to claim 12, wherein the predicted video frames include forward predicted frames, and wherein determining encoding information of the pre-encoded video sequence includes:

obtaining key video frames selected during inter-frame compression of the forward predicted frames and determining the selected key video frames as reference video frames corresponding to the forward predicted frames;

determining a total quantity of the selected reference video frames as a first quantity, determining a total quantity of the key video frames as a second quantity, and determining a total quantity of the forward predicted frames as a third quantity;

determining a first average data capacity of the key video frames according to data capacities corresponding to the key video frames and the second quantity and determining a second average data capacity of the forward predicted frames according to data capacities corresponding to the forward predicted frames and the third quantity;

obtaining a maximum data capacity from the data capacities corresponding to the key video frames, using a ratio of the first average data capacity to the maximum data capacity as a spatial complexity of the pre-encoded video sequence, and determining a ratio of the second average data capacity to the first average data capacity as a temporal complexity of the pre-encoded video sequence; and determining the first quantity, the second quantity, the third quantity, the spatial complexity, the temporal complexity, the resolution of the pre-encoded video sequence, and the bit rate of the pre-encoded video sequence as the encoding information of the pre-encoded video sequence.

16. The video data processing apparatus according to claim 12, wherein determining the encoding bit rate includes:

obtaining a target quality type corresponding to the video quality standard parameter and using a prediction model that is in a prediction model library associated with a plurality of quality types and that matches the target quality type as a target prediction model;

inputting the video feature to the target prediction model and outputting matching degrees between the video feature and a plurality of reference video features in the target prediction model; and using a reference video feature having a highest matching degree with the video feature as a target reference video feature and using sample bit rate information corresponding to quality tag information associated with the target reference video feature as the encoding bit rate associated with the video sequence.

17. The video data processing apparatus according to claim 16, wherein the processor is further configured to execute the computer program instructions and perform:

obtaining N sample video sequences associated with a plurality of service scenes, using sample video features of the N sample video sequences as N reference video features, and obtaining a plurality of quality types associated with the N sample video sequences, N being a positive integer, one sample video feature being determined after pre-encoding one sample video sequence;

obtaining a target quality type from the plurality of quality types and obtaining a sample bit rate parameter associated with the target quality type, the sample bit rate parameter comprising K pieces of sample bit rate information, and K being a positive integer;

performing traversal encoding on each of the N sample video sequences according to the K pieces of sample bit rate information to obtain quality evaluation values of each sample video sequence based on the K pieces of sample bit rate information, one quality evaluation value being determined after encoding one sample video sequence based on one piece of sample bit rate information; and using all the obtained quality evaluation values as quality tag information of an initial model associated with the target quality type, training the initial model according to the quality tag information and the N reference video features, and determining, according to a training result, a prediction model that matches the target quality type.

18. A non-transitory computer-readable storage medium storing computer program instructions executable by at least one processor to perform:

obtaining a video sequence associated with a video source and obtain a video quality standard parameter associated with the video sequence;

determining a video feature according to the video quality standard parameter comprising:

pre-encoding the video sequence according to the video quality standard parameter to obtain a pre-encoded video sequence, the pre-encoded video sequence including key video frames and predicted video frames;

determining encoding information of the pre-encoded video sequence according to the key video frames, the predicted video frames, a resolution of the pre-encoded video sequence, and a bit rate of the pre-encoded video sequence; and determining the encoding information as the video feature corresponding to the video sequence;

determining an encoding bit rate according to the video quality standard parameter and the video feature; and encoding the video sequence according to the encoding bit rate to obtain an encoded video sequence associated with the video source.

\* \* \* \* \*